(12) United States Patent
Bishop et al.

(10) Patent No.: US 8,745,682 B1
(45) Date of Patent: Jun. 3, 2014

(54) INTEGRATED CABLE MODEM AND CABLE TELEVISION MANAGEMENT SYSTEM

(75) Inventors: Daniel S. Bishop, Malibu, CA (US); Michael D. Morris, Cedar Rapids, IA (US); Arvin D. Danielson, Solon, IA (US)

(73) Assignee: Broadcom Corporation, Irvine, CA (US)

( * ) Notice: Subject to any disclaimer, the term of this patent is extended or adjusted under 35 U.S.C. 154(b) by 1496 days.

(21) Appl. No.: 09/954,520

(22) Filed: Sep. 17, 2001

Related U.S. Application Data

(63) Continuation of application No. 09/805,589, filed on Mar. 13, 2001, now abandoned.

(60) Provisional application No. 60/188,779, filed on Mar. 13, 2000.

(51) Int. Cl.
*H04N 7/173* (2011.01)

(52) U.S. Cl.
USPC ........... 725/110; 725/105; 725/109; 725/111; 386/326

(58) Field of Classification Search
USPC ............... 725/75, 87, 91, 100, 111, 114, 131, 725/110; 348/148, 552
See application file for complete search history.

(56) References Cited

U.S. PATENT DOCUMENTS

| | | | | |
|---|---|---|---|---|
| 3,919,479 A | * | 11/1975 | Moon et al. | 704/237 |
| 4,710,969 A | * | 12/1987 | Fluck et al. | 455/67.11 |
| 5,072,296 A | * | 12/1991 | Lim | 348/459 |
| 5,295,154 A | | 3/1994 | Meier et al. | |
| 5,349,678 A | | 9/1994 | Morris et al. | |
| 5,517,232 A | | 5/1996 | Heidemann et al. | |
| 5,555,466 A | * | 9/1996 | Scribner et al. | 725/75 |
| 5,671,436 A | | 9/1997 | Morris et al. | |
| 5,692,213 A | * | 11/1997 | Goldberg et al. | 715/203 |
| 5,729,280 A | | 3/1998 | Inoue et al. | |
| 5,790,536 A | | 8/1998 | Mahany et al. | |
| 5,793,971 A | | 8/1998 | Fujita et al. | |
| 5,818,194 A | | 10/1998 | Nordby | |
| 5,826,168 A | | 10/1998 | Inoue et al. | |
| 5,884,141 A | | 3/1999 | Inoue et al. | |
| 5,898,456 A | * | 4/1999 | Wahl | 725/91 |

(Continued)

OTHER PUBLICATIONS

Thomson, Henry S., et al. *XML Schema Part 1: Structures* (http://www.w3.org/TR/2000/WD-xmlschema-1-20000407/), Apr. 7, 2000.

(Continued)

*Primary Examiner* — Robert Hance
(74) *Attorney, Agent, or Firm* — Brinks Gilson & Lione

(57) ABSTRACT

An integrated cable modem and cable television management system. The invention may include a stand alone device, a portable device, or a vehicle adapted device in various embodiments of the invention. The invention allows for two-way communication and interaction between a television service provider and a user of the device. In addition, other various circuitries may reside in the device allowing storage and processing of received signals. The invention allows a device operable to receive different broadcast signals, including analog and digital signals. In addition, the invention allows for download of selectable programming from a cable television server using the device, either offline, streaming, or in real time when online. The invention allows for recording and buffering of received signals. In addition, the invention allows for control of commercials, publications, and content contained within received signals. The invention allows for time compression of such signals as well.

14 Claims, 19 Drawing Sheets

(56) References Cited

U.S. PATENT DOCUMENTS

| | | | |
|---|---|---|---|
| 5,923,361 A | 7/1999 | Sutton, Jr. | |
| 5,990,881 A | 11/1999 | Inoue et al. | |
| 6,020,912 A | 2/2000 | De Lang | |
| 6,025,868 A * | 2/2000 | Russo | 725/104 |
| 6,049,823 A | 4/2000 | Hwang | |
| 6,148,142 A | 11/2000 | Anderson | |
| 6,169,569 B1 * | 1/2001 | Widmer et al. | 725/111 |
| 6,169,570 B1 | 1/2001 | Suzuki | |
| 6,172,712 B1 | 1/2001 | Beard | |
| 6,195,692 B1 * | 2/2001 | Hsu | 725/110 |
| 6,198,478 B1 | 3/2001 | Ota et al. | |
| 6,340,997 B1 * | 1/2002 | Borseth | 348/731 |
| 6,363,440 B1 * | 3/2002 | Stepp et al. | 710/52 |
| 6,519,771 B1 * | 2/2003 | Zenith | 725/32 |
| 6,526,335 B1 * | 2/2003 | Treyz et al. | 701/1 |
| 2003/0005463 A1 * | 1/2003 | Macrae et al. | 725/112 |
| 2003/0204854 A1 * | 10/2003 | Blackketter et al. | 725/113 |

OTHER PUBLICATIONS

Biron, Paul V., et al. *XML Schema Part 2: Datatypes* (http://www.w3.org/TR/2000/WD-xmlschema-2-20000407/), Apr. 7, 2000.

"Focus Teams with ICTV for Innovative Solution to Set-Top Box", *NewsEdge Insight*, May 1, 2000.

\* cited by examiner

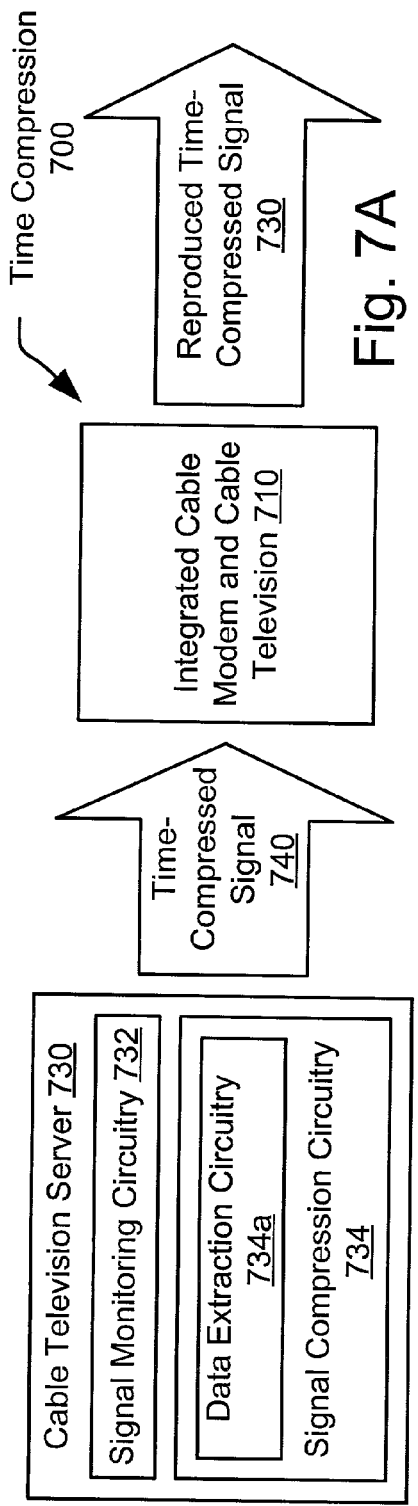
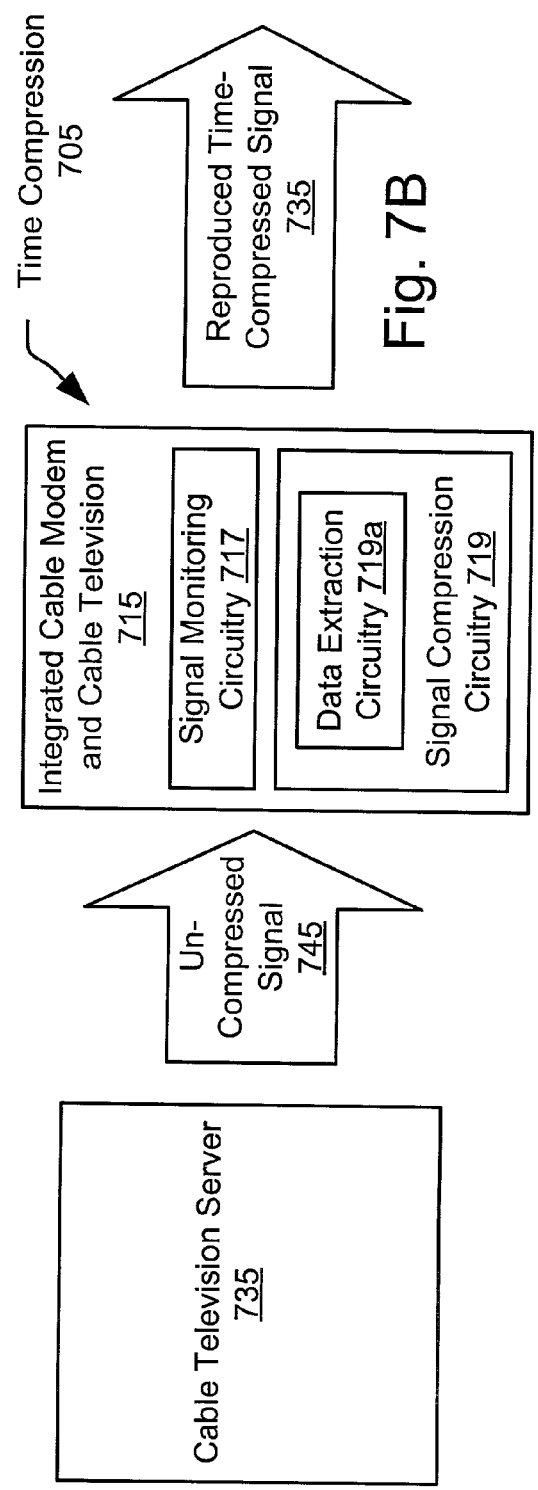

INTEGRATED CABLE MODEM AND CABLE TELEVISION MANAGEMENT SYSTEM

CROSS REFERENCE TO RELATED APPLICATIONS

The present application is a continuation-in-part of U.S. patent application Ser. No. 09/805,589 entitled "INTEGRATED CABLE MODEM AND CABLE TELEVISION MANAGEMENT SYSTEM,", filed Mar. 13, 2001, which in turn claims the benefit under 35 U.S.C. 119(e) of provisional application for patent No. 60/188,779 filed Mar. 13, 2000. All of such applications are hereby incorporated herein by reference in their entirety, including any drawings and appendices, and are made part of the present U.S. Patent Application for all purposes.

The following U.S. Patents are hereby incorporated herein by reference in their entirety, including any drawings and appendices, and are made part of the present U.S. Patent Application for all purposes:

1) U.S. Pat. No. 5,790,536, entitled "HIERARCHICAL COMMUNICATION SYSTEM PROVIDING INTELLIGENT DATA, PROGRAM AND PROCESSING MIGRATION," filed Jun. 7, 1995 and issued Aug. 4, 1998.
2) U.S. Pat. No. 5,726,984, entitled "HIERARCHICAL DATA COLLECTION NETWORK SUPPORTING PACKETIZED VOICE COMMUNICATIONS AMONG WIRELESS TERMINALS AND TELEPHONES," filed Oct. 5, 1995 and issued Mar. 10, 1998.

The following U.S. Patent Application is hereby incorporated herein by reference in its entirety, including any drawings and appendices, and is made part of the present U.S. Patent Application for all purposes:

1) U.S. patent application Ser. No. 09/183,767, entitled "ENHANCED MOBILITY AND ADDRESS RESOLUTION IN A WIRELESS PREMISES BASED NETWORK,", filed Oct. 30, 1998.

BACKGROUND

1. Technical Field

The present invention relates generally to audio and video media communication, storage, display, and processing; and, more particularly, it relates to various methods and systems operable to perform communication, storage, and processing of audio and video media within, among, and between various media operable systems including an integrated cable modem and cable television management system that is operable to receive and manage signals via airwave and satellite broadcast, Internet, and dedicated wireline transmission.

2. Related Art

Traditional cable television broadcast systems typically include a cable television broadcast center and a television that is operable to receive those broadcast signals. There is typically no communication between the cable television broadcast center and the television other that the receipt of programming of the signal by the television from the cable television broadcast center. Commonly, a user of a television within such a system is limited to the programming that is provided by the cable television broadcast center.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in an integrated cable modem and cable television management system. The integrated cable modem and cable television management system includes a cable television server and an integrated cable modem and cable television that is operable to receive a broadcast signal or a digital signal from the cable television server. The integrated cable modem and cable television includes a cable modem that is operable to receive a signal from a cable television server via the Internet, a signal management circuitry that is operable to perform management of the broadcast signal or the digital signal, a signal storage circuitry that is operable to store the broadcast signal and the digital signal, and a signal retrieval and reproduction circuitry that is operable to perform display and transmission of the broadcast signal and the digital signal.

In certain embodiments of the invention, the cable modem is operable to receive the signal from the cable television server via any number of means including video-on-demand, offline video download, and streaming video. The integrated cable modem and cable television management system is operable to perform time compression of the broadcast signal and the digital signal, and the time compression is performed within at least one of the cable television server and the integrated cable modem and cable television. The broadcast signal may be of any number of formats including a digital broadcast signal and an analog broadcast signal. The signal storage circuitry includes a hard drive in certain embodiments of the invention. The cable television server is operable to provide a cable television satellite broadcast service. The integrated cable modem and cable television management system also includes a signal management circuitry that is operable to perform scheduling and signal quality monitoring. The integrated cable modem and cable television management system may also include one or both of a commercial management circuitry and a content management circuitry. The commercial management circuitry is operable to detect a commercial within the broadcast signal and the digital signal, and the content management circuitry is operable to select the broadcast signal and the digital signal based on content. The cable modem is communicatively coupled to the Internet via a connection wherein a portion of the connection comprises a wireless connection. The integrated cable modem and cable television management system also may include a media server network that is operable to perform link assessment of a link through which the cable modem receives the signal from the cable television server. The media server network may also include an adaptive media server network that is operable to perform local media storage on a server when the media includes high demand media. The media server network may be an adaptive media server network that is operable to transfer media between servers when the media comprises infrequently demanded media. The integrated cable modem and cable television may include one or both of a vehicle media system and a portable media system.

Various other aspects of the present invention can be found in any number of devices and systems that perform communication, storage, and processing of audio and video media within, among, and between various media operable systems. These various media systems include vehicle media systems, portable media systems, and media networks that are all operable to perform transmission and receipt of media between and among them. The communication links between the various devices may be wireless or wireline, as desired in any given application. Moreover, portions of the communicative coupling between the various devices may include a portion of wireless connectivity whereas other portions of the communicative coupling may include wireline based communication. The invention allows for receipt of media using alternative communication links, that may be selected on a number of bases, including availability, cost, and quality of service for cost. Media may be received and stored on various devices in accordance with the invention and subsequently displayed or played back on the various devices.

Other aspects, advantages and novel features of the present invention will become apparent from the following detailed description of the invention when considered in conjunction with the accompanying drawings.

BRIEF DESCRIPTION OF THE DRAWINGS

A better understanding of the present invention can be obtained when the following detailed description of various exemplary embodiments is considered in conjunction with the following drawings.

FIG. 7A is a system diagram illustrating an embodiment of a time compression system built in accordance with certain aspects of the present invention.

FIG. 7B is a system diagram illustrating another embodiment of a time compression system built in accordance with certain aspects of the present invention.

DETAILED DESCRIPTION OF THE INVENTION

In view of the above detailed description of the present invention and associated drawings, other modifications and variations will now become apparent to those skilled in the art. It should also be apparent that such other modifications and variations may be effected without departing from the spirit and scope of the present invention.

Figure 1:
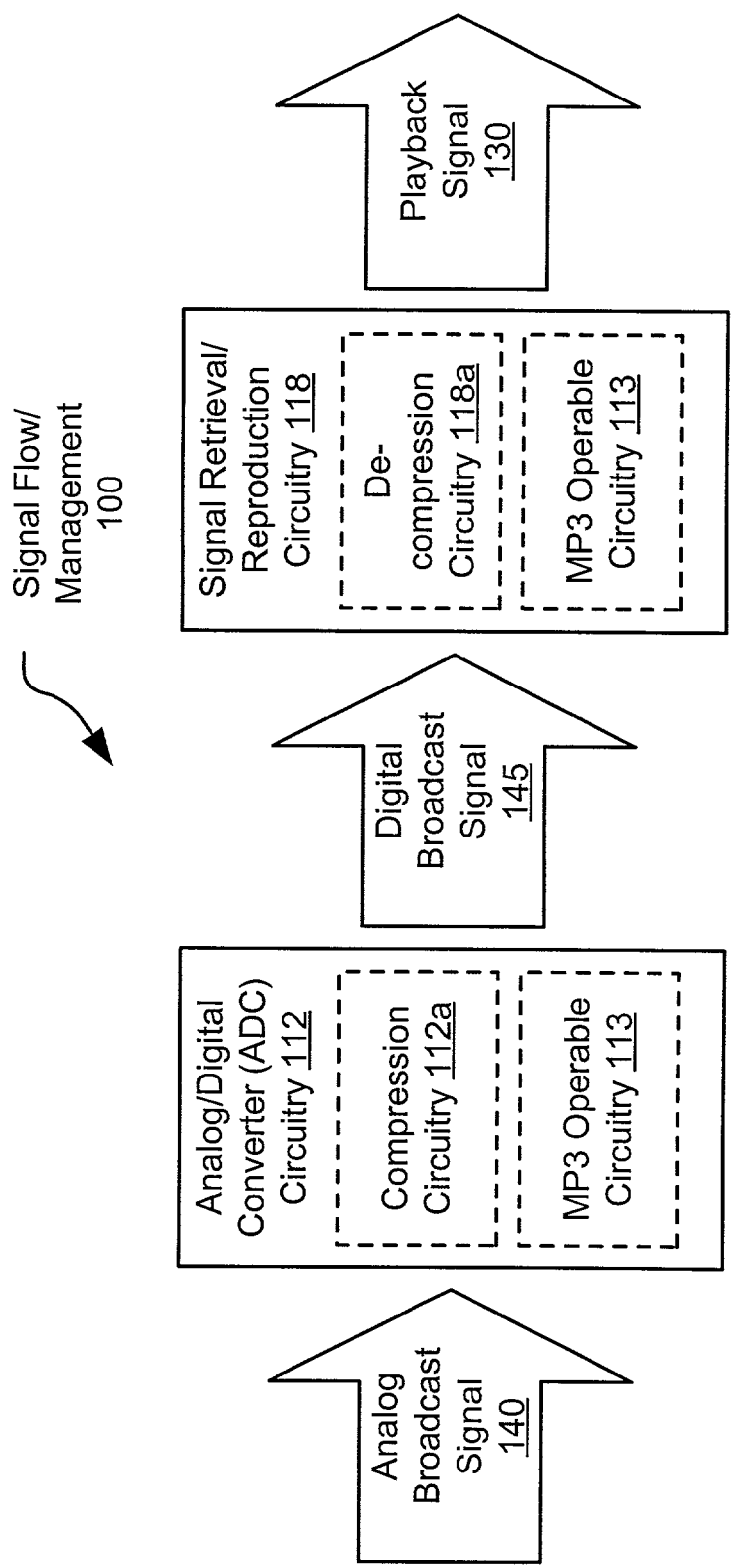
FIG. 1 is a system diagram illustrating an embodiment of a signal flow/management that is performed in accordance with certain aspects of the present invention.

FIG. 1 is a system diagram illustrating an embodiment of a signal flow/management 100 that is performed in accordance with certain aspects of the present invention. The signal flow/management 100 is illustrative of one manner in which an analog broadcast signal 140 is converted into a playback signal 130. In some embodiments of the invention, a digital broadcast signal 145 is converted into the playback signal 130. For those embodiments wherein the analog broadcast signal 140 is converted into the playback signal 130, an analog to digital converter (ADC) circuitry 112 is operable to receive the analog broadcast signal 140 and perform any requisite operation to convert the analog broadcast signal 140 into the digital broadcast signal 145. The digital broadcast signal 145 is, in certain embodiments of the invention, contained within an integrated cable modem and cable television management system and its digital format assists in any necessary signal processing on the signal. If desired, the analog to digital converter (ADC) circuitry 112 contains a compression circuitry 112a and a motion picture expert group 3 (MP3) operable circuitry 112b. Moreover, the analog to digital converter (ADC) circuitry 112 is to transform the analog broadcast signal 140 into the digital broadcast signal 145 wherein the digital broadcast signal 145 wherein the digital broadcast signal 145 is of the motion picture expert group 2 (MPEG2). In other embodiments, the analog broadcast signal 140 is transformed into the MPEG2 standard for reproduction of a signal in high definition television (HDTV) operable systems.

In other embodiments of the invention, the motion picture expert group 3 (MP3) operable circuitry 112b is capable to transform the analog broadcast signal 140 into the digital broadcast signal 145 wherein the digital broadcast signal 145 is of the MP3 format. Also, the compression circuitry 112a is operable to perform any signal processing during the conversion of the analog broadcast signal 140 to the digital broadcast signal 145 that would assist in the preservation or conservation of processing and storage resources within an integrated cable modem and cable television management system in accordance with the present invention.

The digital broadcast signal 145 is passed to a signal retrieval/reproduction circuitry 118 for final conversion into the playback signal 130. The signal retrieval/reproduction circuitry 118 contains, in certain embodiments of the invention, a de-compression circuitry 118a and a motion picture expert group 3 (MP3) operable circuitry 118b. The de-compression circuitry 118a is used to reconstruct the previously compressed analog broadcast 140, that is now in the digital broadcast signal 145 format, into a form suitable for playback using any number of devices including a television or an integrated cable modem and cable television management system. Similarly, the motion picture expert group 3 (MP3) operable circuitry 118b is operable to reconstruct and reproduce the previously converted analog broadcast 140, that is now in the digital broadcast signal 145 MP3 format, into a form suitable for playback of any MP3 encoded signal. The playback signal 130 is of a form of either video or audio or a combination of video and audio, depending on the original format of the analog broadcast signal 140 or the format of the digital broadcast signal 145. The motion picture expert group 3 (MP3) standard is known in the art to be amenable to encoding either video or audio data. The signal flow/management 100 is illustrative of a generic overview of the management of signals in either analog or digital format wherein an original signal is received, and any signal processing is performed on the original signal, and the signal is converted into a format capable of being played back using any number of signal playback media including audio playback media, video playback media known in the art of audio and video data signal processing. Throughout the detailed description of the invention, the use and reference of video data or video signals includes both audio and video data as well as audio data individually.

Figure 2:
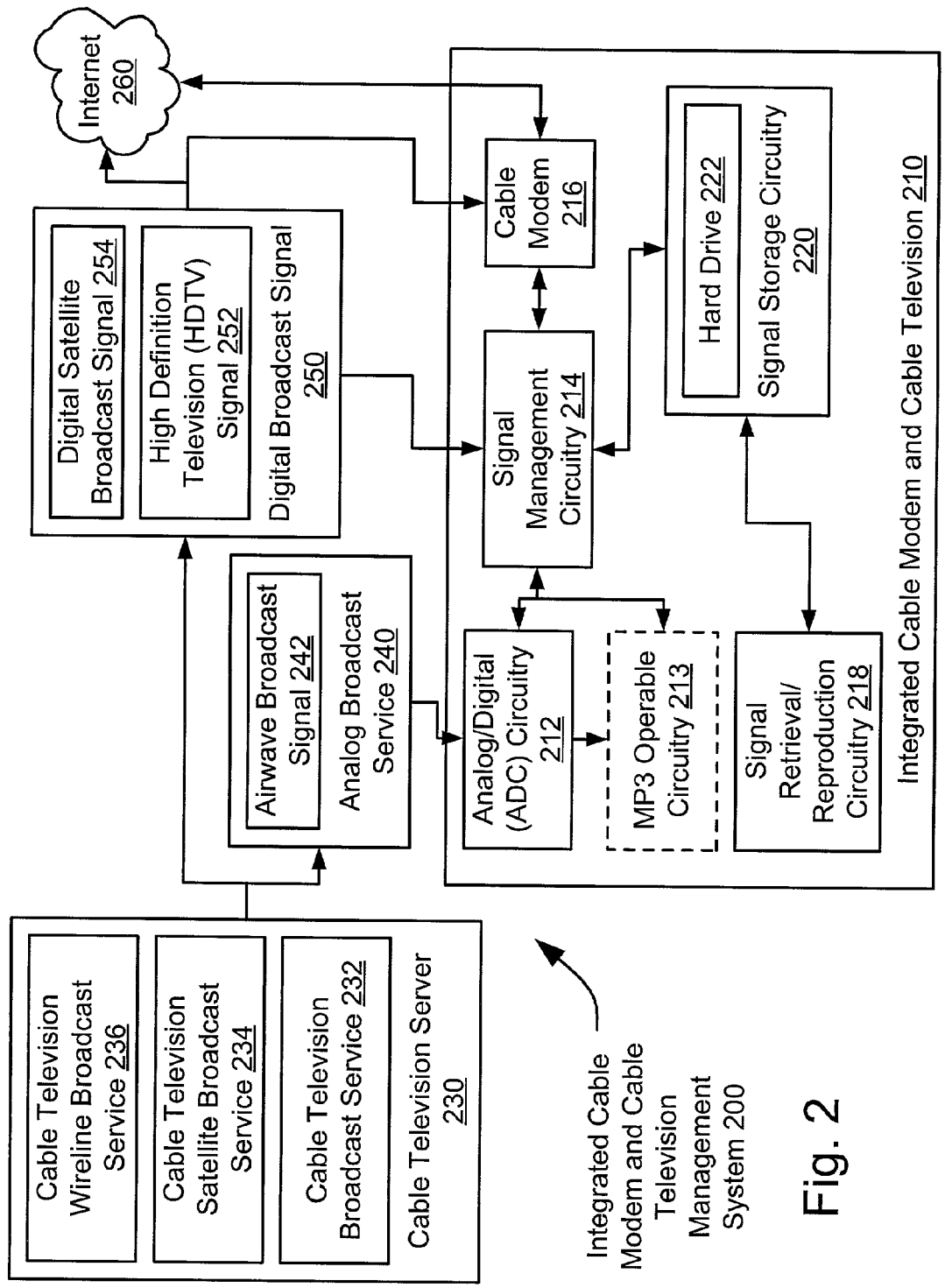
FIG. 2 is a system diagram illustrating an embodiment of an integrated cable modem and cable television management system built in accordance with certain aspects of the present invention.

FIG. 2 is a system diagram illustrating an embodiment of an integrated cable modem and cable television management system 200 built in accordance with certain aspects of the present invention. The integrated cable modem and cable television management system 200, in its most basic representation, contains a cable television server 230 and an integrated cable modem and cable television 210. The cable television server 230 contains any number of methods to transmit and provide video and audio broadcast signals. For example, the cable television server 230 includes, among other things, a cable television broadcast service 232, a cable television satellite broadcast service 234, and a cable television wireline broadcast service 236. The cable television server 230 is operable to provide signals in either analog or digital format without departing from the scope and spirit of the invention. For example, the cable television server is operable to provide an analog broadcast signal 240 and a digital broadcast signal 250. The analog broadcast signal 240 contains an airwave broadcast signal 242 in certain embodiments of the invention. The airwave broadcast signal 242 includes the traditional method of transmitting a broadcast signal from a television tower wherein the signal is transmitted using conventional radio transmission and other electromagnetic frequencies including the ultra high frequency (UHF: 300-3000 MHz) and very high frequency (VHF: 30-300 MHz) frequency spectra known in the art of television airwave broadcast. The analog broadcast signal 240 is provided directly to the integrated cable modem and cable television 210 from the cable television server 230.

In addition, the cable television server provides the digital broadcast signal 250 that itself contains any number of signal types having a digital format such as a high definition television (HDTV) signal 252 and a digital satellite broadcast signal 254. Moreover, the digital broadcast signal 250 is operable to be provided via an Internet 260 path. In such embodiments, the Internet 260 provides the digital broadcast signal 250 to the integrated cable modem and cable television 210. Alternatively, the digital broadcast signal 250 is provided directly to the integrated cable modem and cable television 210 without going through the Internet 260.

The integrated cable modem and cable television 210 itself contains a number of circuitries to perform the handling of the signal provided by the cable television server 230, whether the signal be provided as the analog broadcast signal 240 or the digital broadcast signal 250. In the case when the signal provided is the analog broadcast signal 240, an analog to digital converter (ADC) circuitry 212 within the integrated cable modem and cable television 210 performs the requisite signal processing on the analog broadcast signal 240 to perform any subsequent digital signal processing on the analog broadcast signal 240, including storage and playback of the analog broadcast signal 240. If desired, an MP3 operable circuitry 213 is operable in conjunction with the analog to digital converter (ADC) circuitry 212 to convert the analog broadcast signal 240 into a proper digital format.

The digital format may include a strictly audio signal, such as an "MP3" format, in certain embodiments of the invention. Any other digital format is also included within the scope and spirit of the invention including digital signals having both audio and video content. For example, the MPEG-3 standard is a standard that was originally intended for high definition television (HDTV), but it was later abandoned in favor of MPEG-2. Such standards are also included within the scope and spirit of the invention. The various embodiments of the present invention are operable using any of the MPEG-2, MP3, or generically an MPEG-2/3 standard that operates with the desired digital data format. When the signal provided is the digital broadcast signal 250, and it is provided via the Internet 260, it is fed into a cable modem 216 within the integrated cable modem and cable television 210. Alternatively, the digital broadcast signal 250 is capable of being fed directly into the cable modem 216 in certain embodiments of the invention without having gone through the Internet 260. In addition, the digital broadcast signal 250 is capable of being fed directly into a signal management circuitry 214 in certain embodiments of the invention.

The digital broadcast signal 250 is eventually fed into the signal management circuitry 214, regardless of the path it has taken. In addition, the analog broadcast signal 240 is also fed into the signal management circuitry 214, regardless of the path it has taken. In addition, the analog broadcast signal 240 is also fed into the signal management circuitry 214, after having passed through the analog to digital converter (ADC) circuitry 212. The signal management circuitry 214 is operable to do a variety of functions, several of which are further described later in various embodiments of the invention. The signal management circuitry 214 is operable to pass the broadcast signal, whether it is originally in the form of the analog broadcast signal 240 or the digital broadcast signal 250, to a signal storage circuitry 220. The signal storage circuitry 220 contains a hard drive 222 in certain embodiments of the invention. Present technological storage capacities of hard drives is approximately one (1) Giga-byte memory required to store approximately one (1) hour of video signal data. A hard drive of approximately fourteen (14) Giga-byte memory is presently known in the art. A hard drive of close to thirty (30) Giga-byte memory is foreseeable in the near future. Clearly, as the storage capacities of hard drives continues to increase, the total storage of data will increase as well. A signal retrieval/reproduction circuitry 218 is used to take the broadcast signal and reproduce it for an end user. The end user is an individual watching the broadcast signal (video) or listening to the broadcast signal (audio) in certain embodiments of the invention. Alternatively, the end user is additional circuitry that is operable to perform signal processing on the broadcast signal. The signal retrieval/reproduction circuitry 218 includes any reproduction media that is operable to perform reproduction of the broadcast signal in a form suitable for viewing, listening, or additional signal processing in accordance with the present invention.

The integrated cable modem and cable television management system 200 is operable to receive a broadcast signal in either analog or digital form and to store the broadcast signal using the signal storage circuitry 220, to perform immediate or delayed playback using the signal retrieval/reproduction circuitry 218. The integrated cable modem and cable television management system 200 is operable to perform any desired compression on the broadcast signal before storing it in the signal storage circuitry 220 as well.

Figure 3:
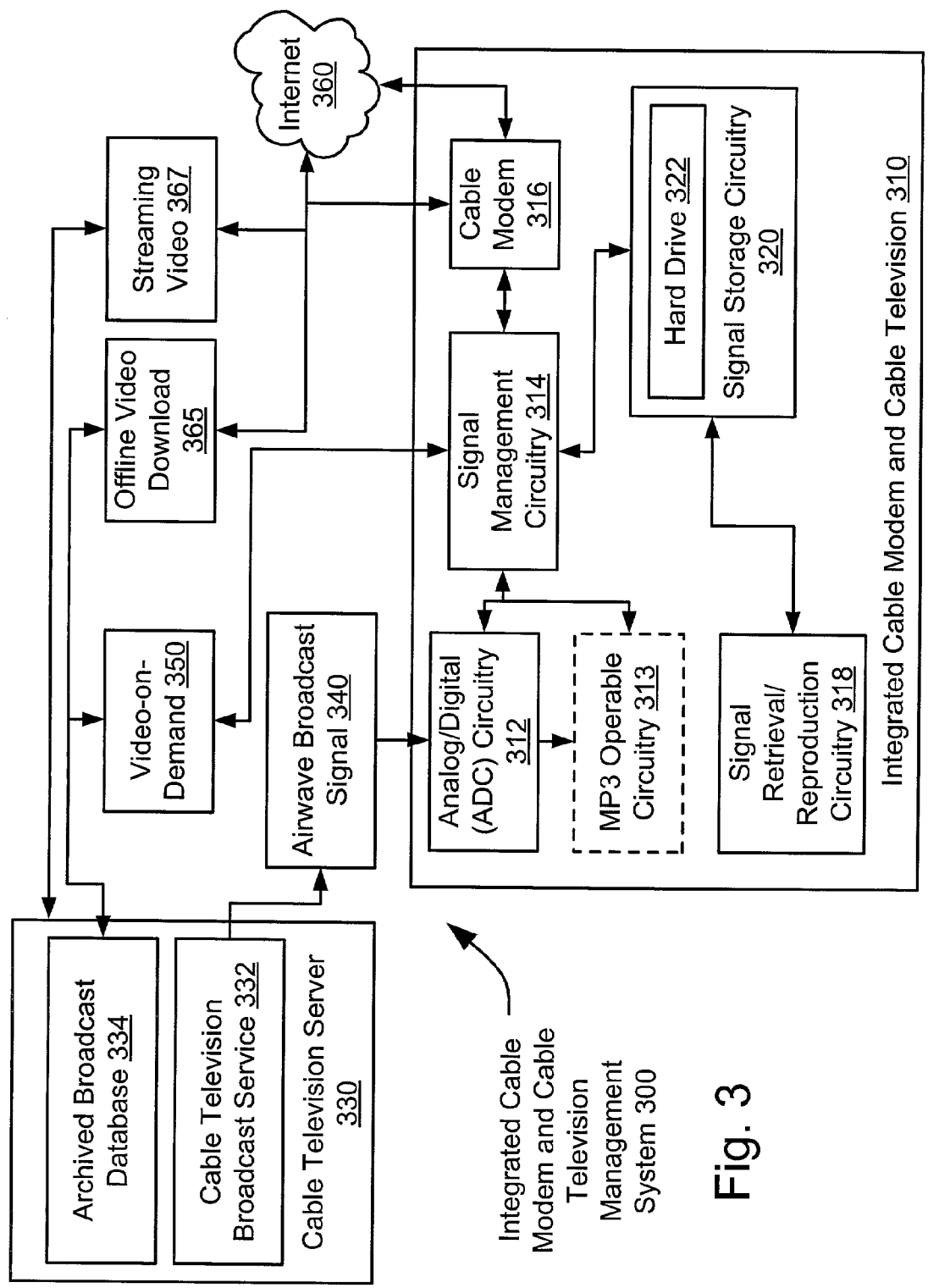
FIG. 3 is a system diagram illustrating another embodiment of an integrated cable modem and cable television management system built in accordance with certain aspects of the present invention.

FIG. 3 is a system diagram illustrating another embodiment of an integrated cable modem and cable television management system 300 built in accordance with certain aspects of the present invention. The integrated cable modem and cable television management system 300, in its most basic representation, contains a cable television server 330 and an integrated cable modem and cable television 310. The cable television server 330 is operable to provide a cable television broadcast service 332 or an archived broadcast database 334. The archived broadcast database 334 contains, in certain embodiments of the invention, archives of past broadcasts of the cable television server 330. In even other embodiments of the invention, the archived broadcast database 334 contains the future, planned broadcasts of the cable television server 330.

The cable television broadcast service 332 of the cable television server 330 provides an airwave broadcast signal 340 that is fed to the integrated cable modem and cable television 310. The archived broadcast database 334 of the cable television server 330 provides a signal operable to provide both a video-on-demand 350 and an offline video download 365. Either of the video-on-demand 350 and the offline video download 365 is operable to be provided to the integrated cable modem and cable television 310 via an Internet 360. Alternatively, the video-on-demand 350 is operable to be provided directly to the integrated cable modem and cable television 310.

In addition, the integrated cable modem and cable television 310 is also operable to perform download and playback of streaming video 367 from the cable television server 330. The streaming video download 367 includes streaming download and playback of data that has an audio component and a video component as well as solely an audio component or solely a video component as described within various embodiments. As is known in the art of streaming data, a portion of the data may be downloaded to a buffer and the playback being initiated during the time in which the remainder of the streaming data is received. If desired, a portion of executable code, stored within the integrated cable modem and cable television 310, initiates the streaming video independent of any user interaction; alternatively, some user-interaction is required before the streaming video 367 commences. Also, this streaming video 367 is operable via the Internet 360 or directly to the cable modem 316 as desired in various embodiments of the invention.

The integrated cable modem and cable television 310 uses an analog to digital converter (ADC) circuitry 312, and if desired, an MP3 operable circuitry 313, to accommodate the airwave broadcast signal 340 when it is in analog format. The signal is then fed into a signal management circuitry 314. Similarly, the archived broadcast signal 334, is fed into the signal management circuitry 314, after having been received via the Internet 360, through a cable modem 316, or fed directly to the signal management circuitry 314 from the video-on-demand 350.

The integrated cable modem and cable television 310 uses a signal storage circuitry 320, containing a hard drive 322 in certain embodiments of the invention, and a signal retrieval/reproduction circuitry 318 in similar fashion as the integrated cable modem and cable television 210 of the FIG. 2 to perform storage and retrieval of the broadcast or archived signal. The integrated cable modem and cable television 310 is operable to perform retrieval and downloading of the broadcast signals using a variety of methods including the video-on-demand 350 or the offline video download 365 that are operable to retrieve a broadcast from the archived broadcast database 334.

Figure 4:
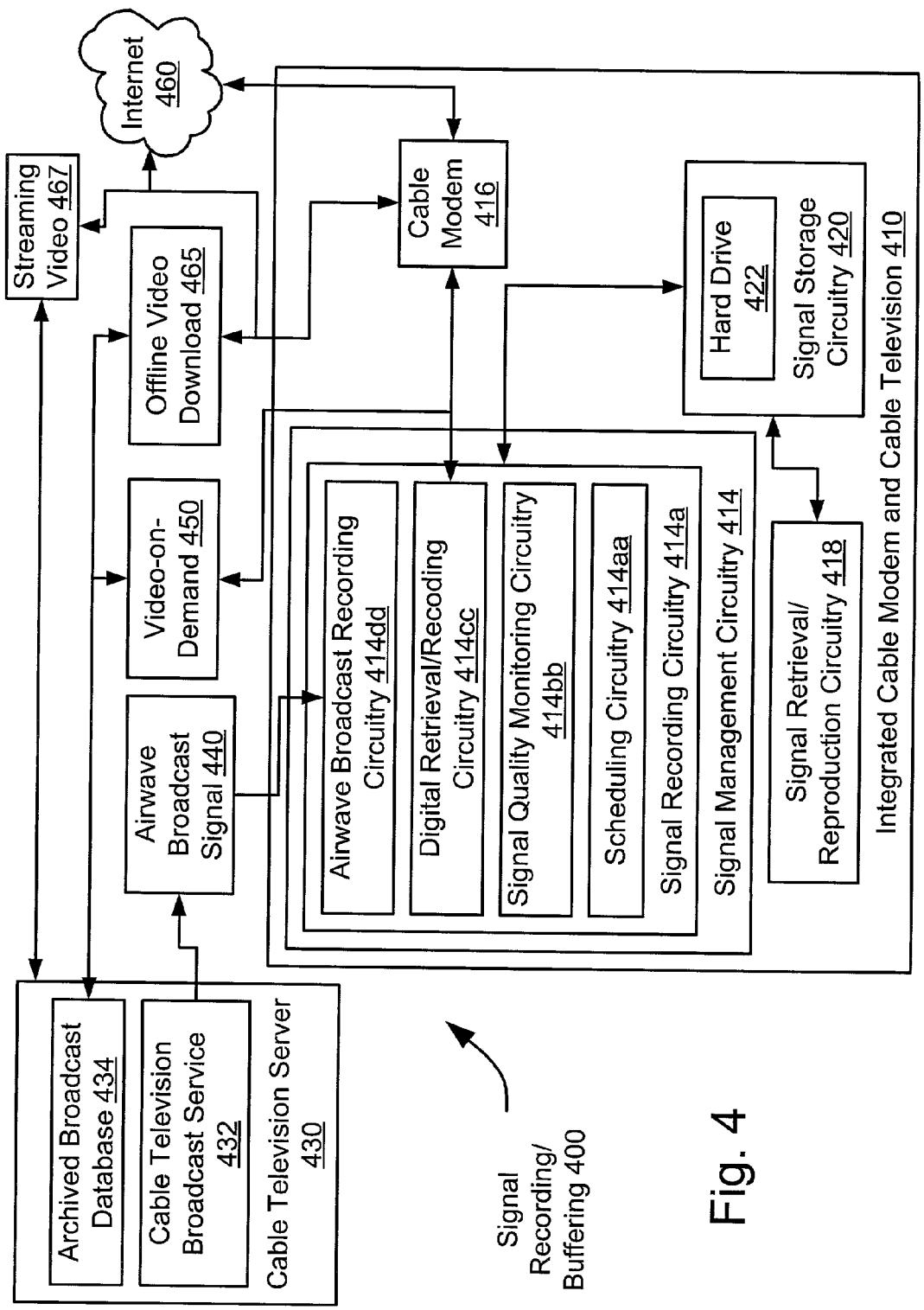
FIG. 4 is a system diagram illustrating an embodiment of a signal recording/buffering system built in accordance with certain aspects of the present invention.

FIG. 4 is a system diagram illustrating an embodiment of a signal recording/buffering system 400 built in accordance with certain aspects of the present invention. The signal recording/buffering system 400, in its most basic representation, contains a cable television server 430 and an integrated cable modem and cable television 410. The cable television server 430 is operable to provide a cable television broadcast service 432 or an archived broadcast database 434. The archived broadcast database 434 contains, in certain embodiments of the invention, archives of past broadcasts of the cable television server 430. In even other embodiments of the invention, the archived broadcast database 434 contains the future, planned broadcasts of the cable television server 430.

The cable television broadcast service 432 of the cable television server 430 provides an airwave broadcast signal 440 that is fed to the integrated cable modem and cable television 410. The archived broadcast database 434 of the cable television server 430 provides a signal operable to provide both a video-on-demand 450 and an offline video download 465. Either of the video-on-demand 450 and the offline video download 465 is operable to be provided to the integrated cable modem and cable television 410 via an Internet 460. Alternatively, the video-on-demand 450 is operable to be provided directly to the integrated cable modem and cable television 410.

In addition, the integrated cable modem and cable television 410 is also operable to perform download and playback of streaming video 467 from the cable television server 430. The streaming video download 467 includes streaming download and playback of data that has an audio component and a video component as well as solely an audio component or solely a video component as described within various embodiments. As is known in the art of streaming data, a portion of the data may be downloaded to a buffer and the playback being initiated during the time in which the remainder of the streaming data is received. If desired, a portion of executable code, stored within the integrated cable modem and cable television 410, initiates the streaming video independent of any user interaction; alternatively, some user-interaction is required before the streaming video 467 commences. Also, this streaming video 467 is operable via the Internet 460 or directly to the cable modem 416 as desired in various embodiments of the invention.

The integrated cable modem and cable television 410 employs a signal management circuitry 414 to control the recording and buffering of broadcasts signals, analog and digital. The integrated cable modem and cable television 410 uses a signal storage circuitry 420, containing a hard drive 422 in certain embodiments of the invention, and a signal retrieval/reproduction circuitry 418 in similar fashion as the integrated cable modem and cable television 210 of the FIG.

2 and the integrated cable modem and cable television 310 of the FIG. 3 to perform storage and retrieval of the broadcast or archived signal.

The signal management circuitry 414 contains a signal recording circuitry 414a that itself contains, a scheduling circuitry 414aa, a signal quality monitoring circuitry 414bb, a digital retrieval/recording circuitry 414cc, and an airwave broadcast recording circuitry 414dd. The scheduling circuitry 414aa is operable to peruse the archived broadcast database 434 to extract past broadcasts and schedule when they are to be played back. Similarly, the scheduling circuitry 414aa is operable to peruse the archived broadcast database 434 to decide which broadcast segments to record in the future. The signal quality monitoring circuitry 414bb is operable to monitor the quality of the incoming signal, and reduce either or both of the audio or video quality of the signal in an effort to maintain constant playback of a broadcast signal. For example, in certain embodiments of the invention, the provision of the broadcast signal may suffer as a function of bandwidth of the cable modem, or the quality the airwave broadcast signal 440 could suffer as a function of whether, and in order to ensure uninterrupted service, the signal quality monitoring circuitry 414bb is operable to reduce the number of frames per unit time that are displayed or to reduce the audio quality from stereo to mono. Similar bandwidth and processing resource measures are within the scope and spirit of the invention. The digital retrieval/recording circuitry 414cc is operable to perform independent retrieval of broadcasts contained within the archived broadcast database 434. The digital retrieval/recording circuitry 414cc is operable, in certain embodiments of the invention, in conjunction with the scheduling circuitry 414aa to decide what to download and when to download it from the archived broadcast database 434. The airwave broadcast recording circuitry 414dd is operable to record the airwave broadcast signal 440 in real time. If desired, when a broadcast program is decided to be recorded during broadcast, the airwave broadcast recording circuitry 414dd is operable to record the remaining portion of the broadcast signal whereas the digital retrieval/recording circuitry 414cc is operable is operable to retrieve the preceding portion of the broadcast that has already passed. In such embodiments of the invention, a dual recording of the broadcast program is being performed, one from the airwave broadcast signal 440 as it is being broadcast in real time and the other from the archived broadcast database 434. If desired, the entirety of the broadcast program could be downloaded from the archived broadcast database 434 in such an embodiment after the broadcast is complete, and the airwave broadcast signal 440 could be displayed in real time to a user. Alternatively, once a user identifies a broadcast (in progress) that he wished to record, the entire program could be downloaded, from its beginning, from the archived broadcast database 434, in a delayed manner such that to a user, the entire program is "new" and not seen before.

Figure 5:
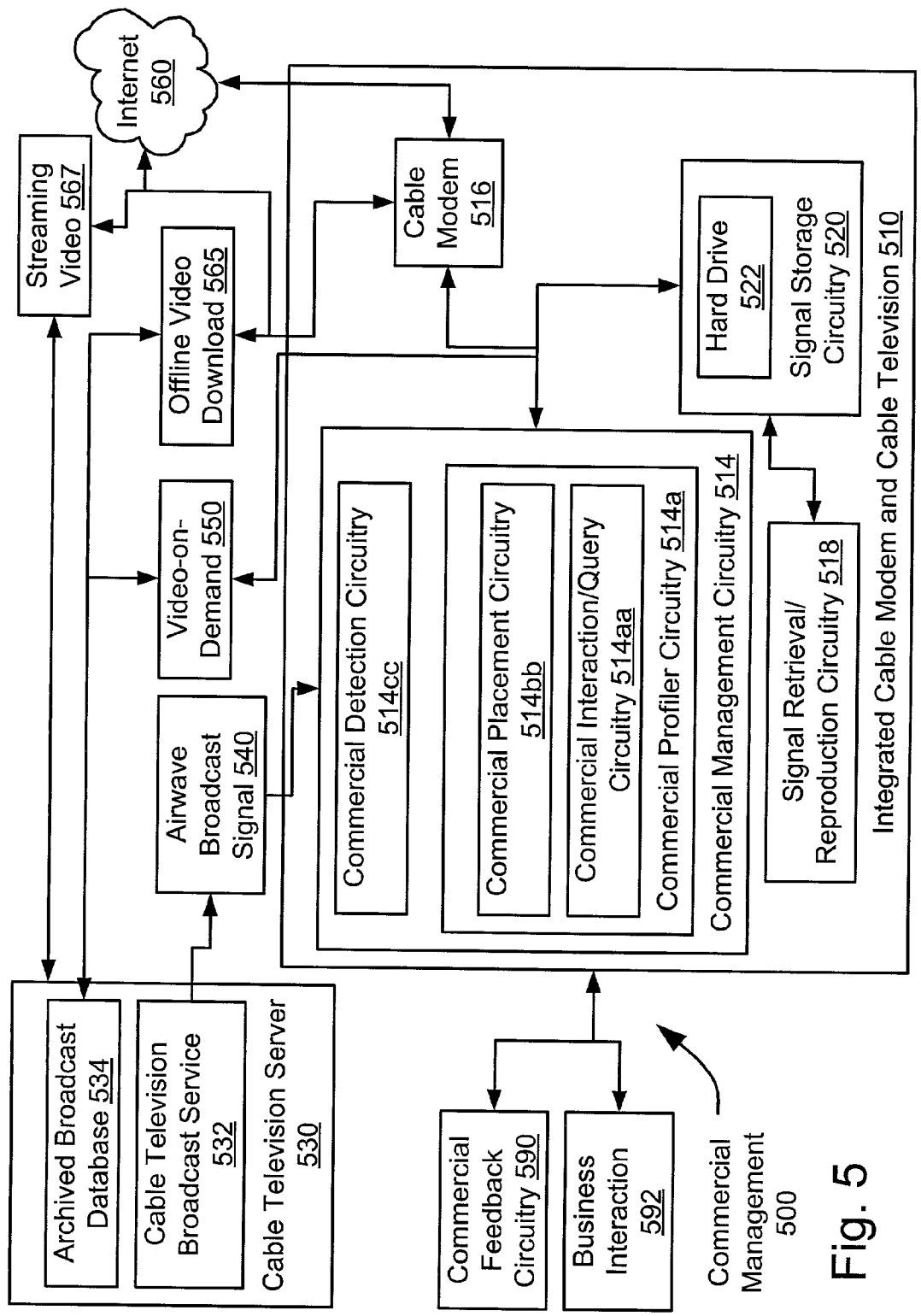
FIG. 5 is a system diagram illustrating an embodiment of a commercial management system built in accordance with certain aspects of the present invention.

FIG. 5 is a system diagram illustrating an embodiment of a commercial management system 500 built in accordance with certain aspects of the present invention. The commercial management system 500, in its most basic representation, contains a cable television server 530 and an integrated cable modem and cable television 510. The cable television server 530 is operable to provide a cable television broadcast service 532 or an archived broadcast database 534. The archived broadcast database 534 contains, in certain embodiments of the invention, archives of past broadcasts of the cable television server 530. In even other embodiments of the invention, the archived broadcast database 534 contains the future, planned broadcasts of the cable television server 530.

The cable television broadcast service 532 of the cable television server 530 provides an airwave broadcast signal 540 that is fed to the integrated cable modem and cable television 510. The archived broadcast database 534 of the cable television server 530 provides a signal operable to provide both a video-on-demand 550 and an offline video download 565. Either of the video-on-demand 550 and the offline video download 565 is operable to be provided to the integrated cable modem and cable television 510 via an Internet 560. Alternatively, the video-on-demand 550 is operable to be provided directly to the integrated cable modem and cable television 510.

In addition, the integrated cable modem and cable television 510 is also operable to perform download and playback of streaming video 567 from the cable television server 530.

The streaming video download 567 includes streaming download and playback of data that has an audio component and a video component as well as solely an audio component or solely a video component as described within various embodiments. As is known in the art of streaming data, a portion of the data may be downloaded to a buffer and the playback being initiated during the time in which the remainder of the streaming data is received. If desired, a portion of executable code, stored within the integrated cable modem and cable television 510, initiates the streaming video independent of any user interaction; alternatively, some user-interaction is required before the streaming video 567 commences. Also, this streaming video 567 is operable via the Internet 560 or directly to the cable modem 516 as desired in various embodiments of the invention.

The integrated cable modem and cable television 510 uses a signal storage circuitry 520, containing a hard drive 522 in certain embodiments of the invention, and a signal retrieval/reproduction circuitry 518 in similar fashion as the integrated cable modem and cable television 210 of the FIG. 2, the integrated cable modem and cable television 310 of the FIG. 3, and the integrated cable modem and cable television 410 of the FIG. 4 to perform storage and retrieval of the broadcast or archived signal.

The integrated cable modem and cable television 510 contains a commercial management circuitry 514 that itself contains a commercial profiler circuitry 514a and a commercial detection circuitry 514cc. The commercial profiler circuitry 514a contains a commercial interaction/query circuitry 514aa and a commercial placement circuitry 514bb. The integrated cable modem and cable television 510 is operable to detect a commercial, whether the commercial is contained in an analog or digital broadcast signal. The commercial profiler circuitry 514a is operable to be used within the integrated cable modem and cable television 510 to control the type and sequence of commercials that are going to be viewed by a user of the integrated cable modem and cable television 510. For example, the commercial interaction/query circuitry 514aa is operable to allow a user to select those commercials that he/she would like to view. The commercial placement circuitry 514bb is operable to control the sequence of when the commercials are viewed by the user. For example, a user may select that all the commercials of a broadcast be placed at the beginning of the broadcast, similar to how commercials and advertisements are placed in the movie industry. Alternatively, a user may select the grouping of what types of commercials are to shown together. A user can use the commercial profiler circuitry 514a to personalize the commercials that he/she is shown. In addition, a user could use the commercial profiler circuitry 514a, in conjunction with the commercial detection circuitry 514cc, to skip all commercials in a broadcast.

A commercial feedback circuitry 590 is operable to provide feedback of a user's selection of which types of commercials to be viewed. This feedback includes any number of information including the product types, the product lines, and the types of commercials. Companies purchasing commercial air time from the cable television server 530 are provided instantaneous feedback on the success/failure of their advertisements. This ability to provide accurate consumer feedback would provide a significant improvement over the conventional methods of trying to model consumer choices and preferences.

A business interaction circuitry 592 is also communicatively coupled to the integrated cable modem and cable television 510 in various embodiments of the invention. The business interaction circuitry 592 is operable cooperatively with the commercial feedback circuitry 590, if desired, to allow real time interaction with companies and customers seeking to transact business with a user of the integrated cable modem and cable television 510. The user may also perform business transactions with companies using the business interaction circuitry 592. For example, in one embodiment, a user of the integrated cable modem and cable television 510 is afforded the opportunity, by using the business interaction circuitry 592, to purchase advertised items from a vendor who purchases commercial air time from the cable television server 530. Similarly, one of the companies purchasing commercial air time from the cable television server 530 may perform modification of their advertising commitment with the company operating the cable television server 530. If desired, this modification is based on the response of users of integrated cable modem and cable televisions to particular advertising. The integrated cable modem and cable television 510 is operable to perform complete business transactions without human interaction.

Figure 6:
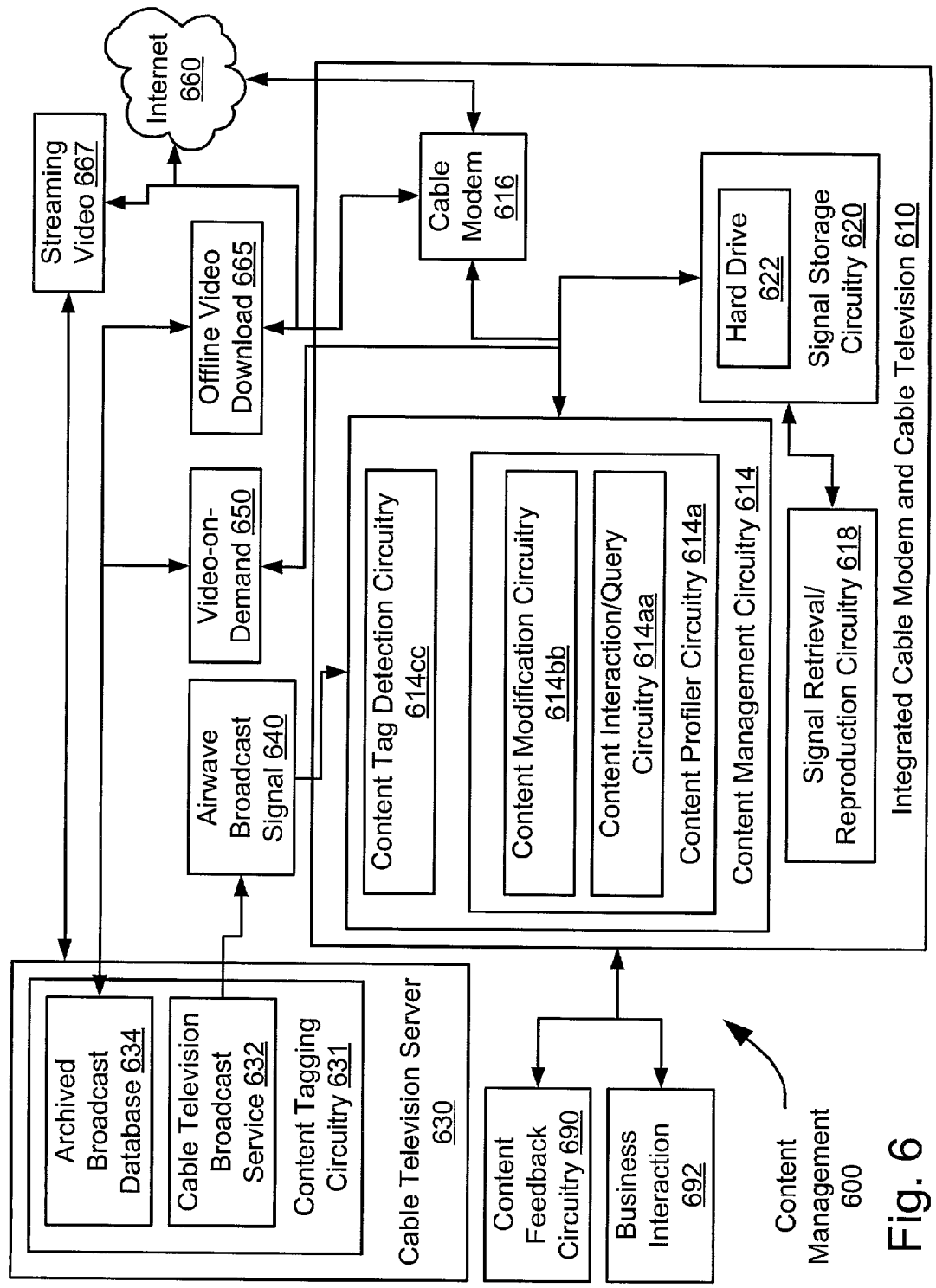
FIG. 6 is a system diagram illustrating an embodiment of a content management system built in accordance with certain aspects of the present invention.

FIG. 6 is a system diagram illustrating an embodiment of a content management system 600 built in accordance with certain aspects of the present invention. The content management system 600, in its most basic representation, contains a cable television server 630 and an integrated cable modem and cable television 610. The cable television server 630 is operable to provide a cable television broadcast service 632 or an archived broadcast database 634. The cable television server 630 employs content tagging circuitry 631 to attach a rating to each of the broadcasts is transmits. The rating is, in certain embodiments of the invention, those known to the television and movie industries such as G, PG, PG-13, R, X, XXX, MA, V, etc. In addition, any other rating system that used to depict the content of a broadcast is included without departing from the scope and spirit of the invention. The archived broadcast database 634 contains, in certain embodiments of the invention, archives of past broadcasts of the cable television server 630. In even other embodiments of the invention, the archived broadcast database 634 contains the future, planned broadcasts of the cable television server 630.

The cable television broadcast service 632 of the cable television server 630 provides an airwave broadcast signal 640 that is fed to the integrated cable modem and cable television 610. The archived broadcast database 634 of the cable television server 630 provides a signal operable to provide both a video-on-demand 650 and an offline video download 665. Either of the video-on-demand 650 and the offline video download 665 is operable to be provided to the integrated cable modem and cable television 610 via an Internet 660. Alternatively, the video-on-demand 650 is operable to be provided directly to the integrated cable modem and cable television 610.

In addition, the integrated cable modem and cable television 610 is also operable to perform download and playback of streaming video 667 from the cable television server 630. The streaming video download 667 includes streaming download and playback of data that has an audio component and a video component as well as solely an audio component or solely a video component as described within various embodiments. As is known in the art of streaming data, a portion of the data may be downloaded to a buffer and the playback being initiated during the time in which the remainder of the streaming data is received. If desired, a portion of executable code, stored within the integrated cable modem and cable television 610, initiates the streaming video independent of any user interaction; alternatively, some user-interaction is required before the streaming video 667 commences. Also, this streaming video 667 is operable via the Internet 660 or directly to the cable modem 616 as desired in various embodiments of the invention.

The integrated cable modem and cable television 610 uses a signal storage circuitry 620, containing a hard drive 622 in certain embodiments of the invention, and a signal retrieval/reproduction circuitry 518 in similar fashion as the integrated cable modem and cable television 210 of the FIG. 2, the integrated cable modem and cable television 310 of the FIG. 3, the integrated cable modem and cable television 410 of the FIG. 4, and the integrated cable modem and cable television 510 of the FIG. 5 to perform storage and retrieval of the broadcast or archived signal.

The integrated cable modem and cable television 610 contains a content management circuitry 614 that itself contains a content profiler circuitry 614a and a content tag detection circuitry 614cc. The content profiler circuitry 614a contains a content interaction/query circuitry 614aa and a content modification circuitry 614bb. In much the same as the integrated cable modem and cable television 510 of the FIG. 5 performs selection of commercials, the integrated cable modem and cable television 610 of the FIG. 6 performs selection of broadcasts as a function of content. For example, a user could select that only broadcasts of a specific rating be received. Alternatively, the integrated cable modem and cable television 610 is operable to perform modification of the broadcast using the content modification circuitry 614bb in much the same way that many of the major television networks modify certain programs for violence and nudity so that they are acceptable for a broader audience. In addition, a user of the integrated cable modem and cable television 610 can select only certain types of rating or content, i.e., only R rated programs or only programs containing violence. Any combination of rating and content is included to be selected by a user.

A content feedback circuitry 690 is operable in much the same way as the commercial feedback circuitry 590 provides feedback of users' selections of commercials in the FIG. 5. The content feedback circuitry 690 is operable to provide feedback of a user's selection of which types of rating and content of programs are to be viewed. This feedback includes information including the rating and the content of programs selected by users. Broadcast companies are provided instantaneous feedback on the types of broadcast programs that are most desirable for their subscribers. This ability to provide accurate cable television consumer AO feedback would provide advantage in choosing what types of programs are most desired by users as well as helping to provide intelligent decision-making for potential advertisers who desire to purchase commercial time. Knowing the types programs that are most commonly selected would allow companies to purchase commercial time in an intelligent manner.

Similar to the embodiment shown in the FIG. 5, a business interaction circuitry 692 is also communicatively coupled to the integrated cable modem and cable television 610 in various embodiments of the invention. The business interaction circuitry 692 is operable cooperatively with the content feedback circuitry 690, if desired, to allow real time interaction with companies and customers seeking to transact business with a user of the integrated cable modem and cable television 610. The user may also perform business transactions with companies using the business interaction circuitry 692. For example, in one embodiment, a user of the integrated cable modem and cable television 610 is afforded the opportunity, by using the business interaction circuitry 692, to purchase advertised items from a vendor who purchases commercial air time from the cable television server 630. Similarly, one of the companies purchasing commercial air time from the cable television server 630 may perform modification of their advertising commitment with the company operating the cable television server 630. If desired, this modification is based on the response of users of integrated cable modem and cable televisions to particular advertising. The integrated cable modem and cable television 610 is operable to perform complete business transactions without human interaction.

FIG. 7A is a system diagram illustrating an embodiment of a time compression system 700 built in accordance with certain aspects of the present invention. The time compression system 700 contains a cable television server 730 and an integrated cable modem and cable television 710. The cable television server 730 employs a signal monitoring circuitry 732 and a signal compression circuitry 734, that itself contains a data extraction circuitry 734a, to generate a time-compressed signal 740. The time-compressed signal 740 is provided to the integrated cable modem and cable television 710 for playback as a reproduced time-compressed signal 730.

Studies have shown that certain portions of program can be intelligently compressed without any perceptual degradation in the overall quality to a viewer or listener. For portions of a broadcast that are substantially similar in video and audio data content as determined by the signal monitoring circuitry 732, a certain number of frames is intelligently extracted using the data extraction circuitry 734a, so that an amount of time is saved from the overall broadcast. For example, when a scene is drawn out over a relatively long period of time and much of the data is highly correlated and similar, a predetermined number of frames (say every $10^{th}$ frame) is extracted from the overall broadcast signal, so that the signal is compressed into the time-compressed signal 740. Any number of intelligent methods are used to determine when the signal is sufficiently similar such that a portion of it can be extracted without departing from the scope and spirit of the invention.

FIG. 7B is a system diagram illustrating another embodiment of a time compression system 705 built in accordance with certain aspects of the present invention. The time compression system 705 contains a cable television server 735 and an integrated cable modem and cable television 715. The integrated cable modem and cable television 715 employs a signal monitoring circuitry 717 and a signal compression circuitry 719, that itself contains a data extraction circuitry 719a, to convert an un-compressed signal 745 into a reproduced time-compressed signal 735.

As described above with respect to the time compression system 700 of the FIG. 7A, Studies have shown that certain portions of program can be intelligently compressed without any perceptual degradation in the overall quality to a viewer or listener. For portions of a broadcast that are substantially similar in video and audio data content as determined by the signal monitoring circuitry 717, a certain number of frames is intelligently extracted using the data extraction circuitry 719a, so that an amount of time is saved from the overall broadcast. For example, when a scene is drawn out over a relatively long period of time and much of the data is highly correlated and similar, a predetermined number of frames (say every $10^{th}$ frame) is extracted from the overall broadcast signal, so that the signal is compressed into the reproduced time-compressed signal 735. Any number of intelligent methods are used to determine when the signal is sufficiently similar such that a portion of it can be extracted without departing from the scope and spirit of the invention.

The time compression system 700 of the FIG. 7A and the time compression system 705 of the FIG. 7B are illustrative of where the time compression of a signal is performed in either of server (the cable television server 730 of the FIG. 7A) or a receiver (the integrated cable modem and cable television 715 of the FIG. 7B) within any of the various embodiments illustrated above in the detailed description of the various Figures.

Figure 8:
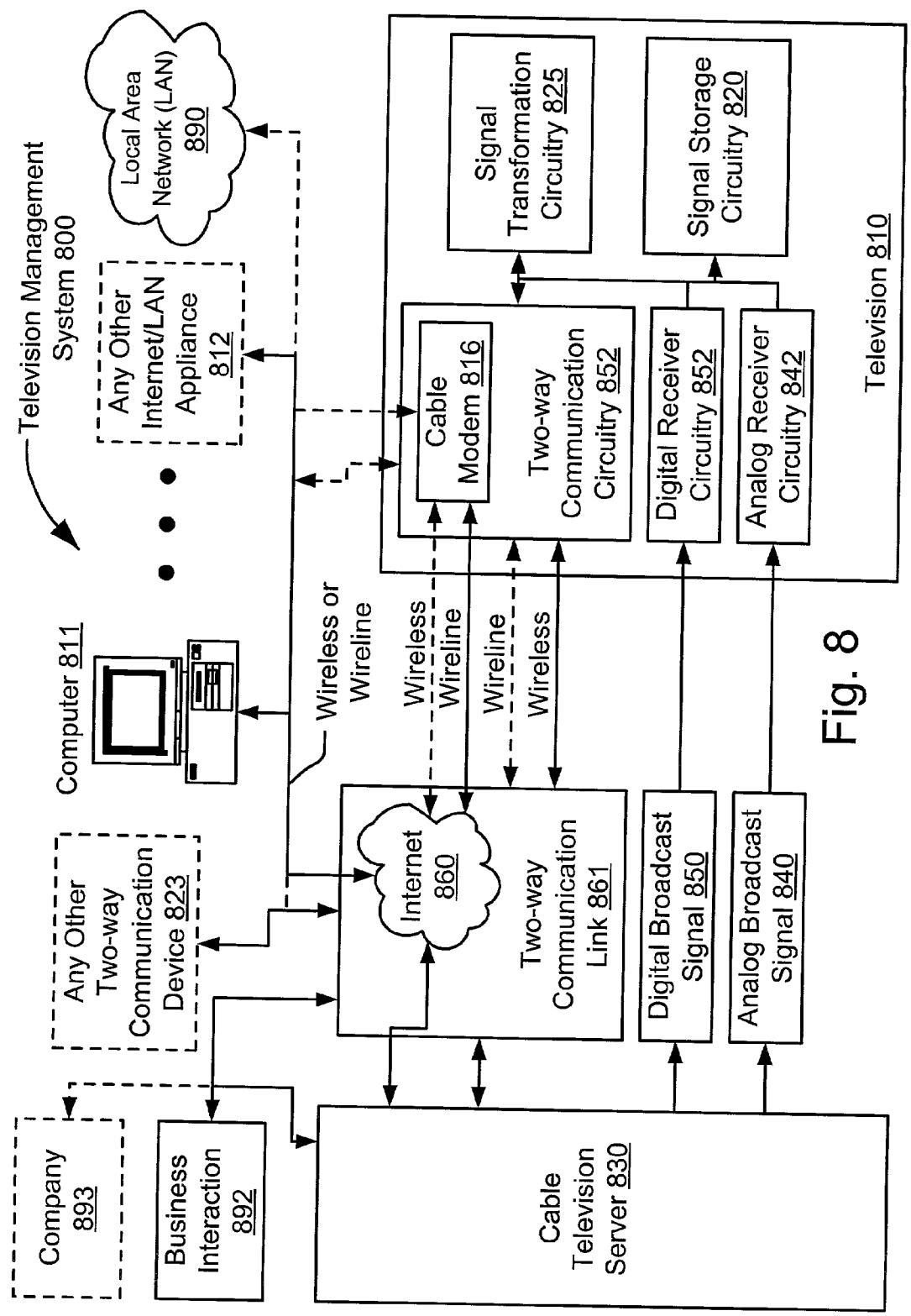
FIG. 8 is a system diagram illustrating an embodiment of a television management system built in accordance with certain aspects of the present invention.

FIG. 8 is a system diagram illustrating an embodiment of a television management system 800 built in accordance with certain aspects of the present invention. A cable television server 830 is operable to broadcast either one or both of a digital broadcast signal 850 and an analog broadcast signal 840. A television 810 is operable to receive the digital broadcast signal 850 and the analog broadcast signal 840. In certain embodiments of the –15 invention, the television 810 is an integrated cable modem and cable television. The television 810 employs a digital receiver circuitry 852 to accommodate the digital broadcast signal 850 and an analog receiver circuitry 842 to accommodate the analog broadcast signal 840. The television 810 employs a two-way communication circuitry 852 that is operable to communicate with the cable television server 830 and any other two-way communication device 823 as well via a two-way communication link 861.

In certain embodiments of the invention, the two-way communication circuitry 852 contains a cable modem 816 that is operable to communicate with the cable television server 830 and the any other two-way communication device 823 as well via the two-way communication link 861. The two-way communication link 861 includes the Internet in some embodiments. The cable modem 816 is operable to communicate with any number of other devices via the Internet 860. For examples, the television 810 is operable to communicate with a computer 811 and a local area network (LAN) 890 using either the two-way communication circuitry 852 and/or the cable modem 816. Any other Internet/LAN appliance 812 is also communicatively coupled to the Internet 860. If desired, the local area network (LAN) 890 is an Internet-operable network in applications desirous of access to the Internet 860. In certain embodiments of the invention, the local area network (LAN) 890 is a home based LAN.

The television 810 also contains signal transformation circuitry 825 and a signal storage circuitry 820. The signal transformation circuitry 825 is operable to perform transformation of any received signal, such as either one of the digital broadcast signal 850 and the analog broadcast signal 840, into any other form of signal. For example, the analog broadcast signal 840 may be transformed into a digital signal within the television 810. Moreover, the signal transformation circuitry 825 is operable to perform transformation of a stored signal into the another format for display or transmission to any of the other devices communicatively coupled to the television 810. The signal storage circuitry 820 is operable to store any received signal, such as either one of the digital broadcast signal 850 and the analog broadcast signal 840, for subsequent transformation, display, or transmission.

In certain embodiments of the invention, the television management system 800 provides for communication from the television 810 to the cable television server 830. The television 810 is operable to receive broadcast signals directly from the cable television server 830 without any interaction or communication with the cable television server 830. However, the television 810 is also operable to receive broadcast signals from the cable television server 830 after having selected certain programming and requested that it be provided to the television 810. If desired, the television 810 is operable to select a particular broadcast and to receive that broadcast. Moreover, a number of cable televisions, or a number of integrated cable modem and cable televisions, may be operable to select a particular broadcast and to receive that broadcast. For example, the number of integrated cable modem and cable televisions are operable to select the particular broadcast and to receive that broadcast. The cable television server 830 is operable to process the selections of the television 810 or the number of integrated cable modem and cable televisions in order to process the selections and to determine which broadcast to perform.

Alternatively, the television 810 is operable to receive programming from the cable television server 830 by transmission via the two-way communication link 861. The requested and received signal may then be stored in the signal storage circuitry 820. If necessary or if desired, requested and received signal may be transformed into a more desirable or usable form, depending on the application, by the signal transformation circuitry 825.

Also included within the scope and spirit of the invention is the ability to perform such operations initially using a device communicatively coupled to the Internet 860 or the local area network (LAN) 890, and then to provide the video and/or audio data to the television 810. For example, the computer 811 is operable to perform all of the functionality described within the television 810 in certain embodiments of the invention. In such an instant, the computer 811 is operable to perform all of the described functionality such as receipt, processing, storage, and transformation of a signal and then to provide it to another device, such as another computer or the television 810 or another television.

In other words, all of the functionality described within the various embodiment of the television 810, as well as the various embodiments of integrated cable modem and cable televisions within the various Figures, may be incorporated within a computer capable of offering such functionality. As the components and functionality offered by a television and a computer continue to merge and the differences become less and less, a "computer" that is operable for television functionality, or having a built in television, is such a device into which the various functionality of the present invention may also be incorporated. In such an instance, a "black box" device, having both computer functionality and television functionality would be operable to perform and to provide the various aspects of the present invention.

It is also noted that the devices used to perform the communicative coupling between the various devices described in the various embodiments of the present invention include both wireline, wireless, optical, and other communicative coupling methods and practices known in the art. For example, the communicative coupling between the two-way communication circuitry 852 and the two-way communication link 861 is performed via a wireline connection in certain embodiments of the invention; in others, it is a wireless connection. Similarly, the communicative coupling between the cable modem 816 and the Internet 860 is performed using either a wireline connection or a wireless connection.

The television 810 is operable to perform coupling to any intermediary connection that subsequently allows connection to the two-way communication link 861 or the Internet 860 without departing from the scope and spirit of the invention. For example, an infrared or radio frequency connection may be made from the television 810 to a peripheral intermediary device or a wall connection in a building before the communicative coupling to either the two-way communication link 861 or the Internet 860 is completed. While in certain embodiments of the invention, the television 810 is a true "cable" television having a physical cabled connection between itself and the wall, there may be portions of the communicative coupling between the television 810 and the other various devices within the present invention that include wireless communication as well. The use and interchange of such wireline (e.g., "cable") interconnections and wireless interconnections, within any of the various embodiments, does not depart from the scope and spirit of the invention. A cable television is operable where a portion of its communicative coupling is provided via such wireless connections.

Similarly, the communicative coupling provided by the local area network (LAN) 890 is achieved using either wireline or wireless connections. For all purposes within this patent application, the term wireline includes the use of dielectric "wired" media such as optical fiber having a physical component completing the communicative coupling between the various devices.

A business interaction circuitry 892 is also communicatively coupled to the television 810 via the two-way communication link 861, which may include the Internet 860, and the cable television server 830 in various embodiments of the invention. The business interaction circuitry 892 of the FIG. 8 is operable is all of the ways described for the business interaction circuitries 592 and 692 within the embodiments of the FIGS. 5 and 6, respectively. The business interaction circuitry 892 is accessible by a user of the television 810 and anyone with authorized access to the cable television server 830. For example, such a company 893 is able to use the business interaction circuitry 892 in certain embodiments of the invention. The company 893 may purchase advertising time or air time from the cable television server 830. In addition, the company 893 may conduct business transactions with a user of the television 810. Also, the interconnectivity between the company 893 and the cable television server 830, and the two-way communication link 861, is operable when portions of interconnectivity include wireless connections as well.

A user of the television 810 is able to initiate and conduct such business transactions with the company 893 and the cable television server 830. Alternatively, the television 810 automatically initiates the business transactions with the company 893 and the cable television server 830. For example, the television 810 is operable to be programmed to perform certain business transactions at certain times without the necessity of user interaction in various embodiments of the invention. One example of such a business transaction includes a payment of cable television service via the two-way communication link 861. Other business transactions are also included within the scope and spirit of the invention. It is also noted that any other devices communicatively coupled to the television 810 and the cable television server 830 are able to perform business transactions as well.

Figure 9:
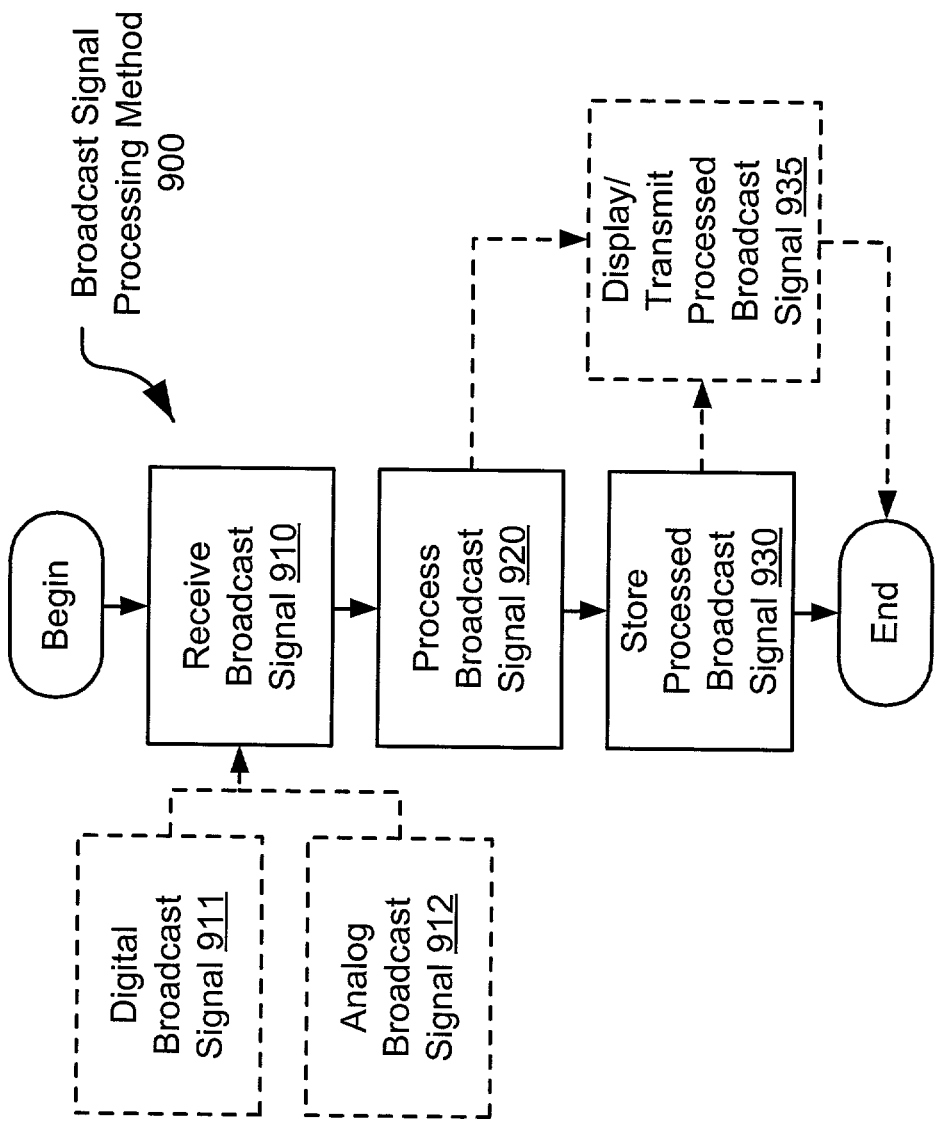
FIG. 9 is a functional block diagram illustrating an embodiment of a broadcast signal processing method performed in accordance with certain aspects of the present invention.

FIG. 9 is a functional block diagram illustrating an embodiment of a broadcast signal processing method 900 performed in accordance with certain aspects of the present invention. In a block 910, a broadcast signal is received. The broadcast signal is any number of broadcast signals including a digital broadcast signal 911 and an analog broadcast signal 912.

Then, in a block 920, the broadcast signal received in the block 910 is processed in the block 920. Ultimately, the processed broadcast signal is stored in a block 930. Alternatively, the processed broadcast signal is either displayed and/or transmitted in a block 935. The display in the block 935 include any number of display methods including using a television, a computer, or any other system operable to perform display of a broadcast signal or a processed broadcast signal. The transmission of the processed broadcast signal in the block 935 includes any of the processed described in the present invention including via the Internet or via a local area network (LAN) to any number of devices communicatively coupled to either and or both the Internet or the LAN.

Figure 10:
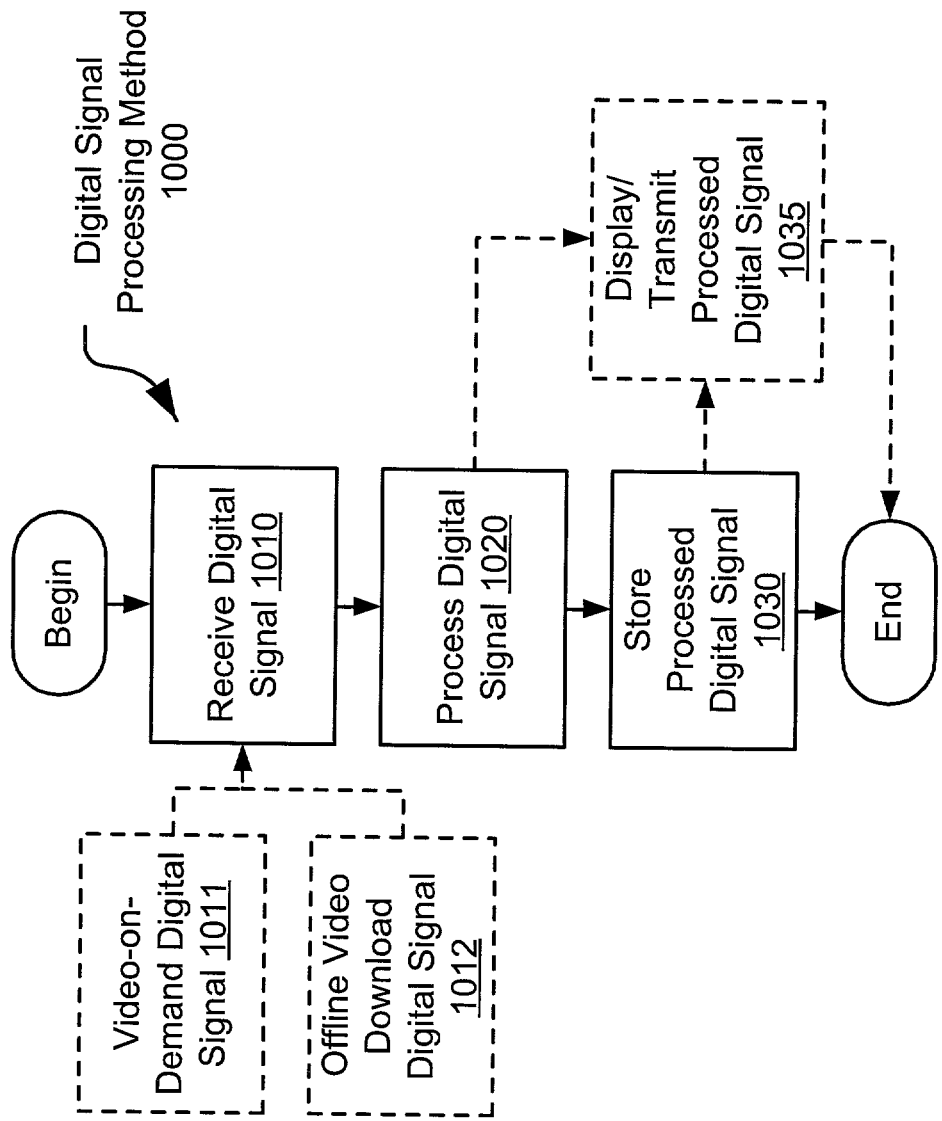
FIG. 10 is a functional block diagram illustrating an embodiment of a digital signal processing method performed in accordance with the present invention.

FIG. 10 is a functional block diagram illustrating an embodiment of a digital signal processing method 1000 performed in accordance with certain aspects of the present invention. In a block 1010, a digital signal is received. The received digital signal in the block 1010 is any number of signals including a video-on-demand digital signal 1011 and an offline video download signal 1012. In a block 1020, the received digital signal is processed in a block 1020. Then, that processed digital signal is stored in a block 1030. Alternatively, the processed digital signal is either displayed and/or transmitted in a block 1035. The display in the block 1035 include any number of display methods including using a television, a computer, or any other system operable to perform display of a broadcast signal or a processed broadcast signal. The transmission of the processed broadcast signal in the block 1035 includes any of the processed described in the present invention including via the Internet or via a local area network (LAN) to any number of devices communicatively coupled to either and or both the Internet or the LAN.

Figure 11:
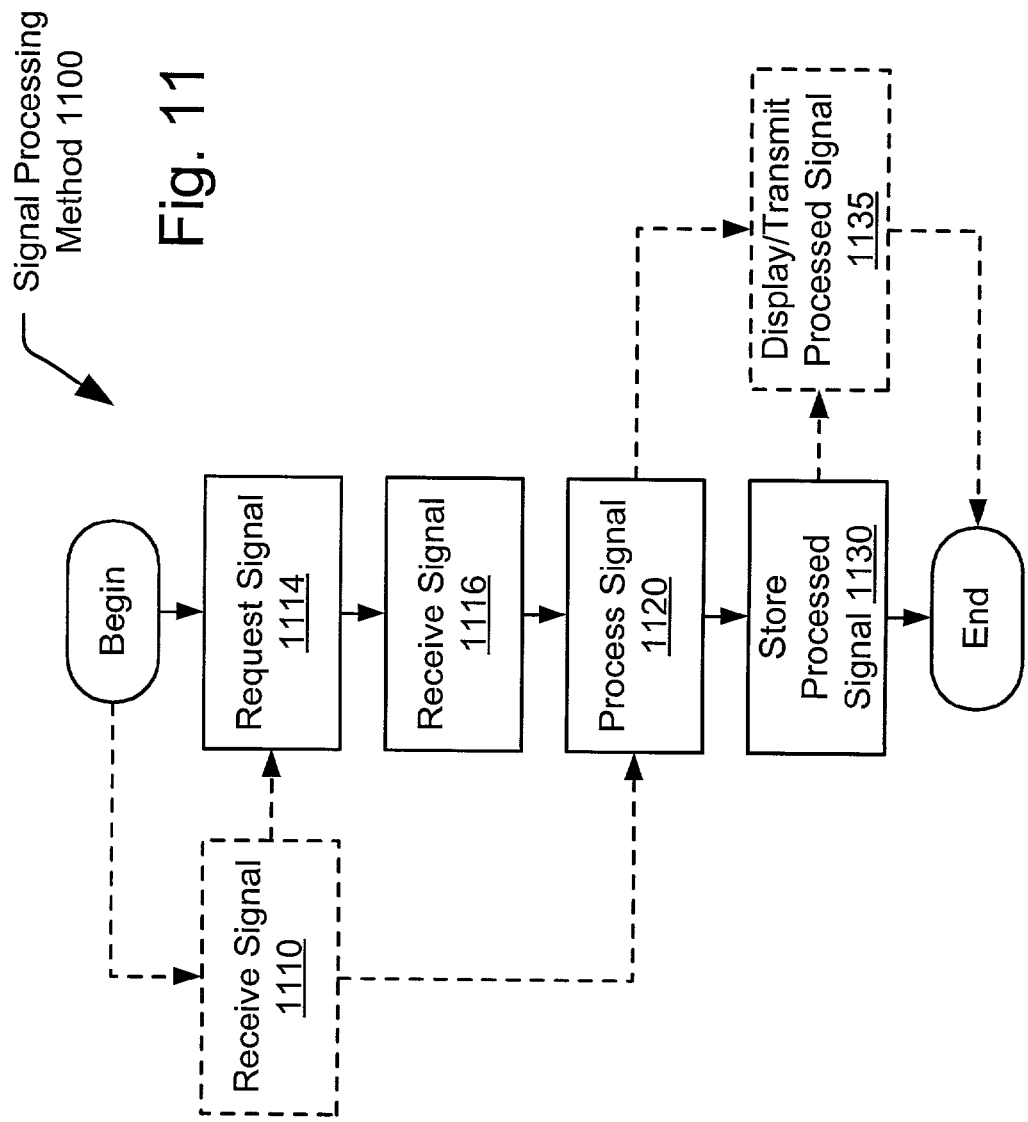
FIG. 11 is a functional block diagram illustrating an embodiment of a signal processing method performed in accordance with certain aspects of the present invention.

FIG. 11 is a functional block diagram illustrating an embodiment of a signal processing method 1100 performed in accordance with certain aspects of the present invention. In a block 1114, a signal is requested. Before the request of the signal in the block 1114, a signal is received in a block 1110. In certain embodiments of the invention, a first signal may be received in the block 1110, then a second signal is received in the block 1114. Alternatively, the same signal is received in the block 1110 and requested, perhaps for continued reception, in the block 1114. Then, in a block 1116, a signal is received. The signal received in the block 1116 is different than the signal received in the block 1110; it is the same signal in other embodiments. Then, the signal is processed in a block 1120. Is desired in certain embodiments, the signal received in the block 1110 is processed in the block 1120. Alternatively, the signal received in the block 1114 is processed in the block 1120. If desired, both the signal received in the block 1110 and the signal received in the block 1114 are processed in the block 1120.

Ultimately, the processed signal is stored in a block 1130. Alternatively, the processed signal is either displayed and/or transmitted in a block 1135. The display in the block 1135 include any number of display methods including using a television, a computer, or any other system operable to perform display of a broadcast signal or a processed broadcast signal. The transmission of the processed broadcast signal in the block 1135 includes any of the processed described in the present invention including via the Internet or via a local area network (LAN) to any number of devices communicatively coupled to either and or both the Internet or the LAN. The signal processing method 1100 includes the transmission of a signal between various devices, as shown in the embodiment of the invention shown in the FIG. 8.

Figure 12:
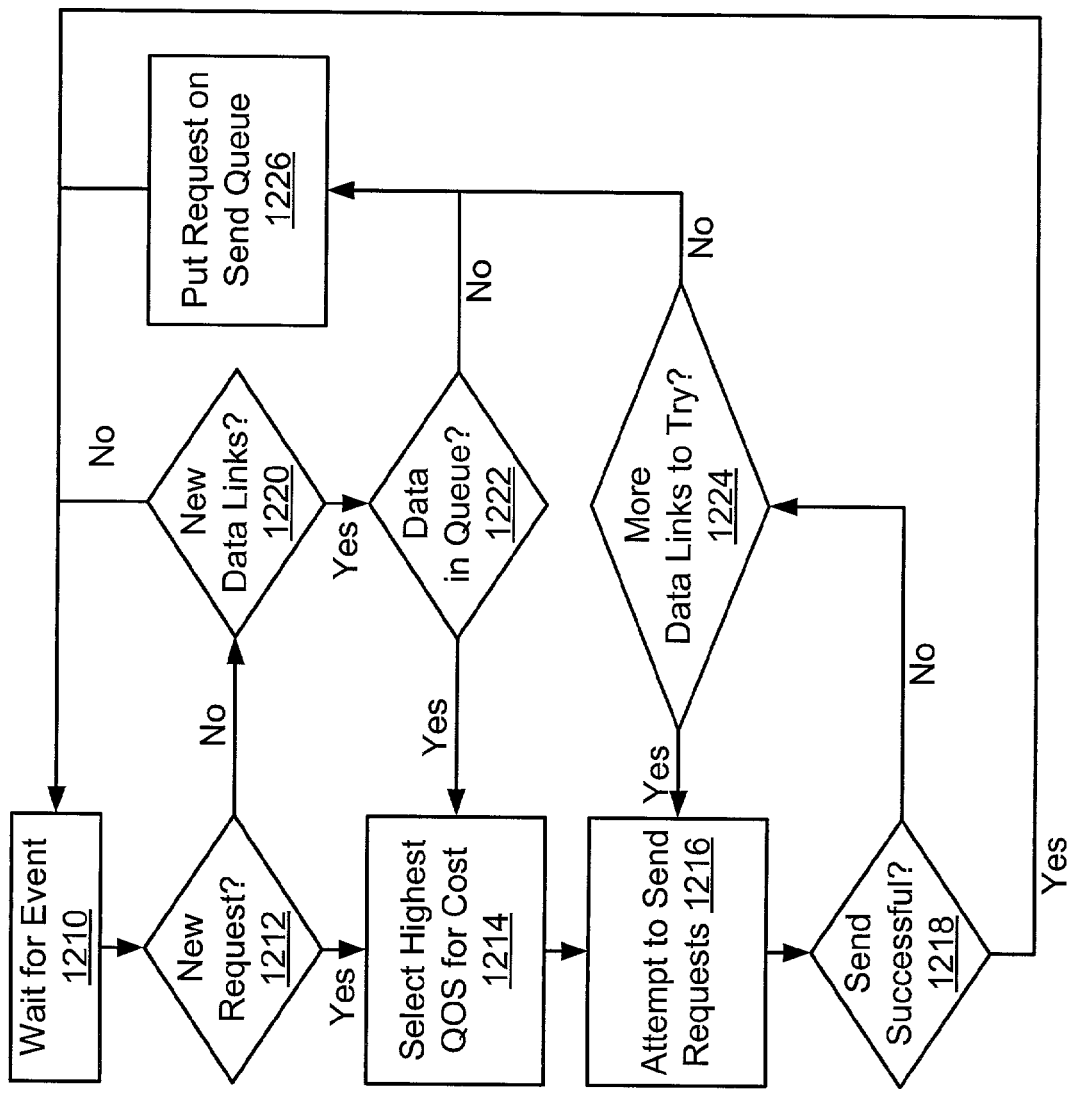
FIG. 12 is a functional block diagram illustrating a send process performed using certain aspects of the present invention.

FIG. 12 is a functional block diagram illustrating a send process 1200 performed using certain aspects of the present invention. The FIG. 12 shows the send process 1200 that occurs if a request cannot be fulfilled locally. This send process 1200 waits for an event to occur. If the event is a new request message to send, then it attempts to service the send request immediately. Of the data links that are available, the process chooses the highest quality of service (QOS) not exceeding the cost required by the request. If the optimal data link fails then each of the data links that do not exceed the requested cost will be tried in descending order of QOS until the list is exhausted or the data is sent. The other event that can trigger the link selection process is when a new data link becomes connected to the device. Since data packets have been queued because the appropriate cost link was not available, the availability of a new link triggers an examination of the send queue for requests that can be sent over the new link. Thus, data will be sent as soon as an appropriate data link is available to the system. The FIG. 12 shows the send process 1200 of a data collection terminal. The request is always processed when it is first put in the queue and then if it is not sent it will be put in the send queue with the other requests waiting an appropriate data link. Also when a new data link is detected all messages that can use that data link will be sent. The various functionality of the send process 1200 shown in the FIG. 12 is also described below from another perspective.

In a block 1210, any system that performs the send process 1200 waits for an event to occur. After one has occurred, then, in a decision block 1212, it is determined of the event is a new request. If it is a new event, then the send process 1200 proceeds to the block 1214, where a highest QOS is selected for cost. For example, the send process 1200 may be further controlled to choose a highest QOS that does not exceed the cost required by the request. Then, in a block 1216, the send process 1200 attempts to send requests. Further in a decision block 1218, it is determined whether the attempted send action of the block 1216 was successful. If the send was not successful, as determined in the decision block 1218, then in a decision block 1224, it is further determined whether there are more data links to try. If there are more data links to try as determined in the decision block 1224, then the send process 1200 returns to the attempt to send requests block 1216. Alternatively, however, if the send was successful, as determined in the decision block 1218, then the send process 1200 returns to the wait for event functional block 1210.

However, back to the determination in the decision block 1212, if it is determined that the event of the block 1210 is not a new request, then in a decision block 1220, it is further determined if any new data links are available. If there are none available, then the send process 1200 waits returns to the wait for event functional block 1210. However, if there are new data links available as determined in the decision block 1220, then in a decision block 1222, it is determined whether there are data in queue. If there are data in queue, then the send process goes to the block 1214 where a highest quality of service (QOS) is selected for cost. If no data is in queue, however, the send process 1200 goes to a put request on send queue functional block 1226. Similarly, if in the decision block 1224 it is determined that there are no more data links to try, then the send process 1200 also goes to the put request on send queue functional block 1226. After the operation of the put request on send queue functional block 1226, the send process 1200 returns to the wait for event functional block 1210. The send process 1200 may operate indefinitely in this continuous operation.

Figure 13:
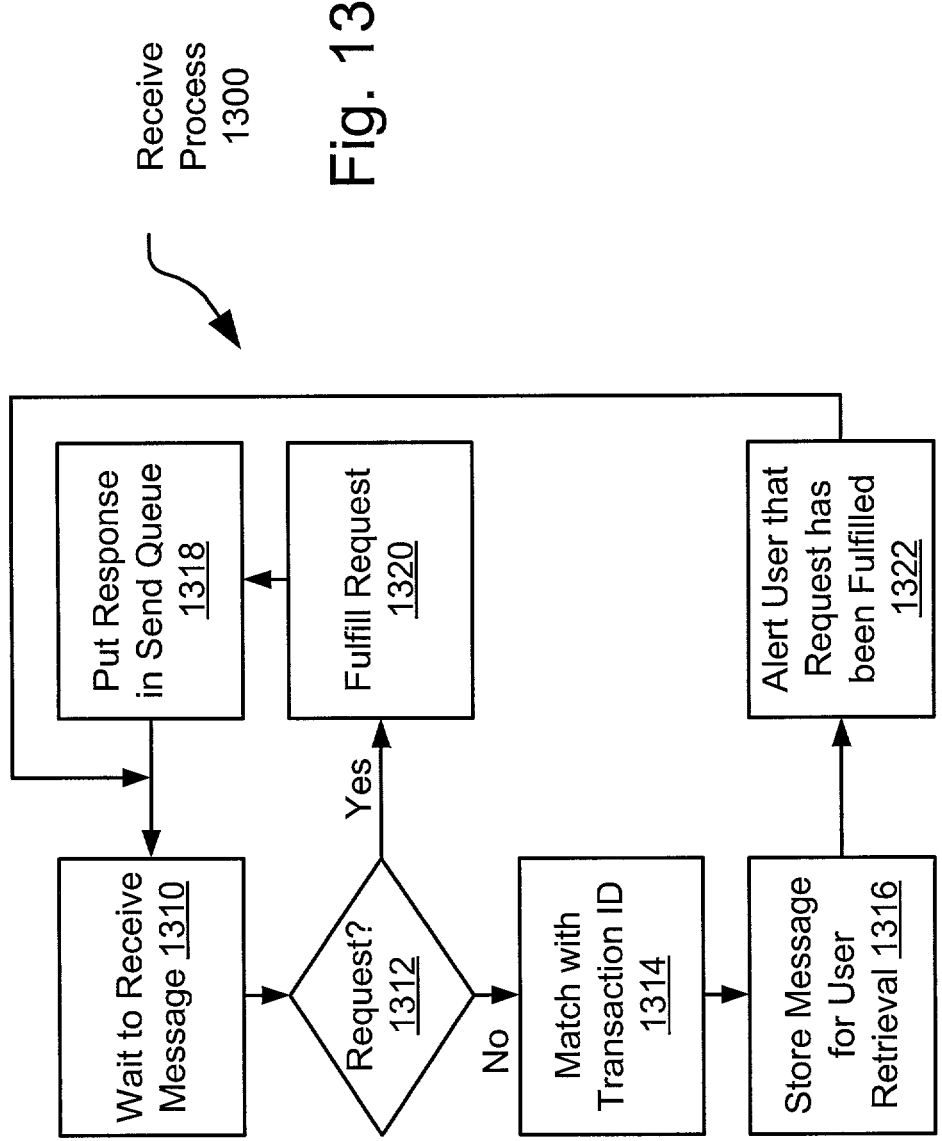
FIG. 13 is a functional block diagram illustrating a receive process performed using certain aspects of the present invention.

FIG. 13 is a functional block diagram illustrating a receive process performed using certain aspects of the present invention. The FIG. 13 shows the receive process 1300 of receiving responses from another systems component. This process matches the response with the original request through the transaction number stored in the request and inserted into the response by an upstream information system. This data is then stored via transaction number and the upper layer application program notified that the transaction result is available for processing. The FIG. 13 also shows processing of a request from another systems component. The response process will copy the maximum cost information from the request to the response message for sending to the host and thus the "send process" as described in FIG. 1 can be used to send responses as well as requests. The FIG. 13 shows the receive process 1300. The response may be out of sequence from the users current activities and thus the user must be given the opportunity to view the transaction or to continue with the current task and return to the transaction later. The various functionality of the receive process 1300 shown in the FIG. 13 is also described below from another perspective.

In a block 1310, the receive process 1300 waits to receive a message. Then, when a message is received, it is then determined whether the received message is a request in a decision block 1312. If it is determined that the received message is a request in the decision block 1312, then the request is fulfilled in a block 1320. Then, the response is put in a send queue in a block 1318.

However, If it is determined that the received message is not a request in the decision block 1312, then the received message is matched with a transaction identification (ID) in a block 1314. The message is then stored for user retrieval in a block 1316, and the user is also alerted that the request has been fulfilled in a block 1322. The receive process 1300 then goes back to the wait to receive a message functional block 1310. Similar to the send process 1200, the receive process 1300 may operate indefinitely in this continuous operation. Both the send process 1200 and the receive process 1300 may operate cooperatively in various embodiments of the invention.

Moreover, both the send process 1200 and the receive process 1300 may be employed within any of the various embodiments of the invention to effectuate a high QOS connection (be it wireless or wireline), among other benefits of the send process 1200 and the receive process 1300. For example, when any of the various embodiments of integrated cable modem and cable televisions shown above in the various embodiments of the invention desire to find a particular connection to a cable television server, or simple a television server (say in a wireless context), the send process 1200 and the receive process 1300 may be employed to that end. The same applicability of the send process 1200 and the receive process 1300 may similarly be extended to the various embodiments shown below as well.

Figure 14:
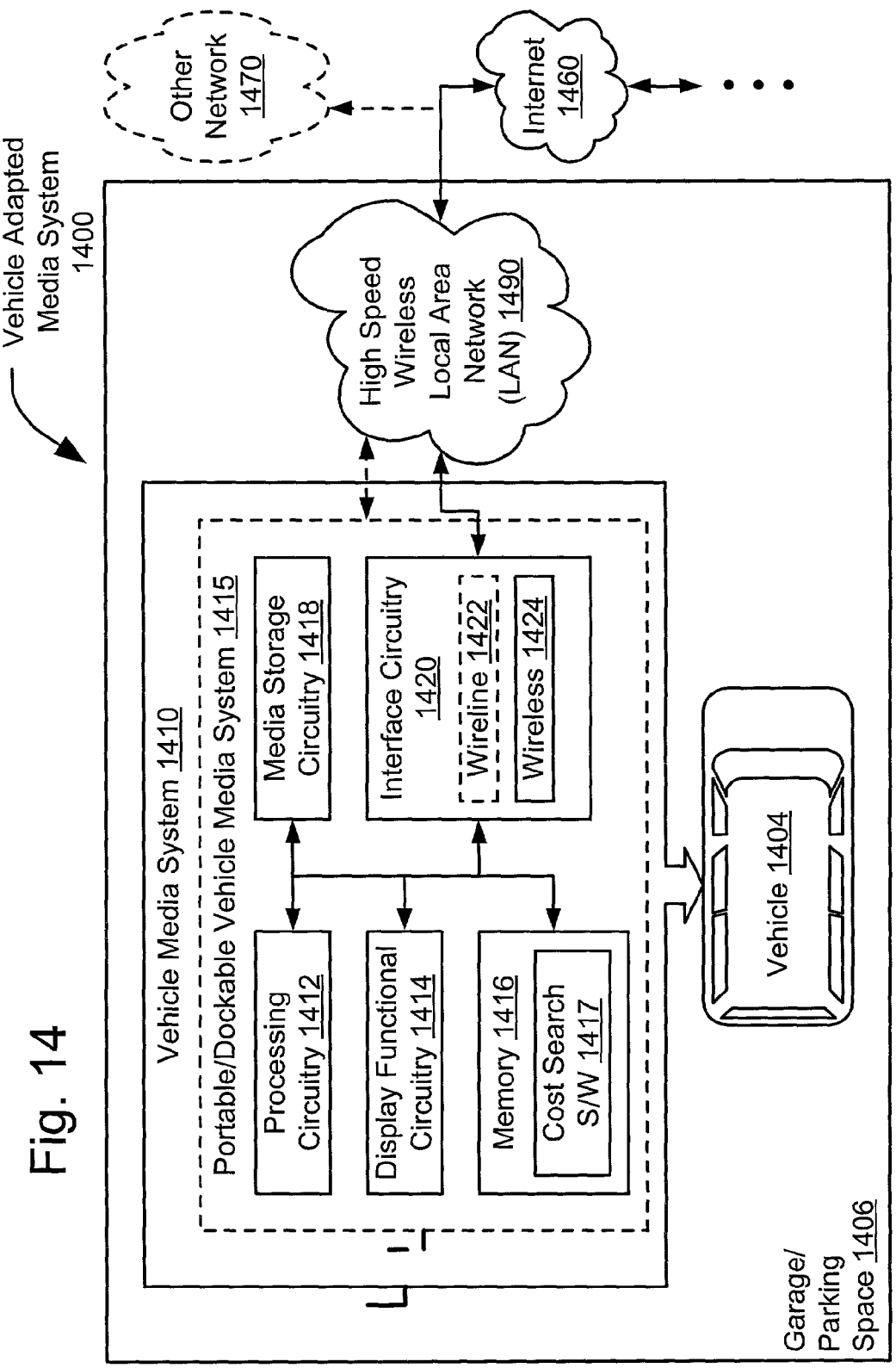
FIG. 14 is a system diagram illustrating an embodiment of a vehicle adapted media system that is built in accordance with certain aspects of the present invention.

FIG. 14 is a system diagram illustrating an embodiment of a vehicle adapted media system that 1400 is built in accordance with certain aspects of the present invention. The vehicle adapted media system that 1400 is operable using a vehicle media system 1410 that may be mounted within a vehicle 1404. The vehicle media system 1410 is also equipped to perform wireless communication functionality. An antenna may used in certain embodiments of the invention. The vehicle media system 1410 may be permanently mounted within the vehicle 1404, but as will be seen in various embodiments of the invention, a vehicle media system 1410 that is a portable/dockable vehicle media system 1415 is oftentimes more desirable for accommodating many diverse applications. However, the vehicle media system 1410 may nevertheless be permanently mounted within the vehicle 1404 without departing from the scope and spirit of the invention.

The vehicle 1404 is shown as being parked within a garage/parking space 1406. The garage/parking space 1406 is merely exemplary, and any environment that offers the functionality of the garage/parking space 1406 is operable using various aspects of the invention, as will be seen. The garage/parking space 1406 is illustrated as an example of a place in which nearly every vehicle 1404 will be at one time or another. Within the garage/parking space 1406, the vehicle media system 1410 is able to perform communicative coupling, and communication, with a high speed wireless local area network (LAN) 1490. It is noted, however, that the vehicle media system 1410, when provided with hard-wire, or wireline communicative coupling, may also perform communicative coupling and communication with the high speed wireless LAN 1490. As described above in various embodiments of the invention, the use of segmented portions of wireless or wireline communicative coupling between various components of the various embodiments does not depart from the scope and spirit of the invention. The high speed wireless LAN 1490 is then operable to communicate with the Internet 1460, or any other network 1470 as well.

The high speed wireless LAN 1490 is exemplary of a high speed Internet access, or any other network access for that matter, that may achieved with the vehicle media system 1410. The vehicle media system may also be equipped to perform all of the functionality of the various embodiments of integrated cable modem and cable televisions shown above in the various embodiments of the invention. For example, the high speed wireless LAN 1490 may provide the channel through which offline video download, streaming video, or other media transfers may be performed within the scope and spirit of the invention. Similarly, the vehicle media system 1410 may also be equipped to provide for receipt of airwave broadcasts, of both analog and digital format. That is to say, the vehicle media system 1410 may include all of the various functionality of the various embodiments of integrated cable modem and cable televisions shown above in the various embodiments of the invention. The vehicle adaptability of the vehicle media system 1410, within the context of the vehicle adapted media system that 1400, illustrates one example of the adaptability of the various aspects of the present invention in multiple contexts, including those involving means of individual transportation, such as the vehicle 1404. It is understood that a media system built in accordance with the invention could also be adapted to any other vehicle, including common carrier means of transportation such as trains, airplanes, and other vehicles as well.

Figure 15:
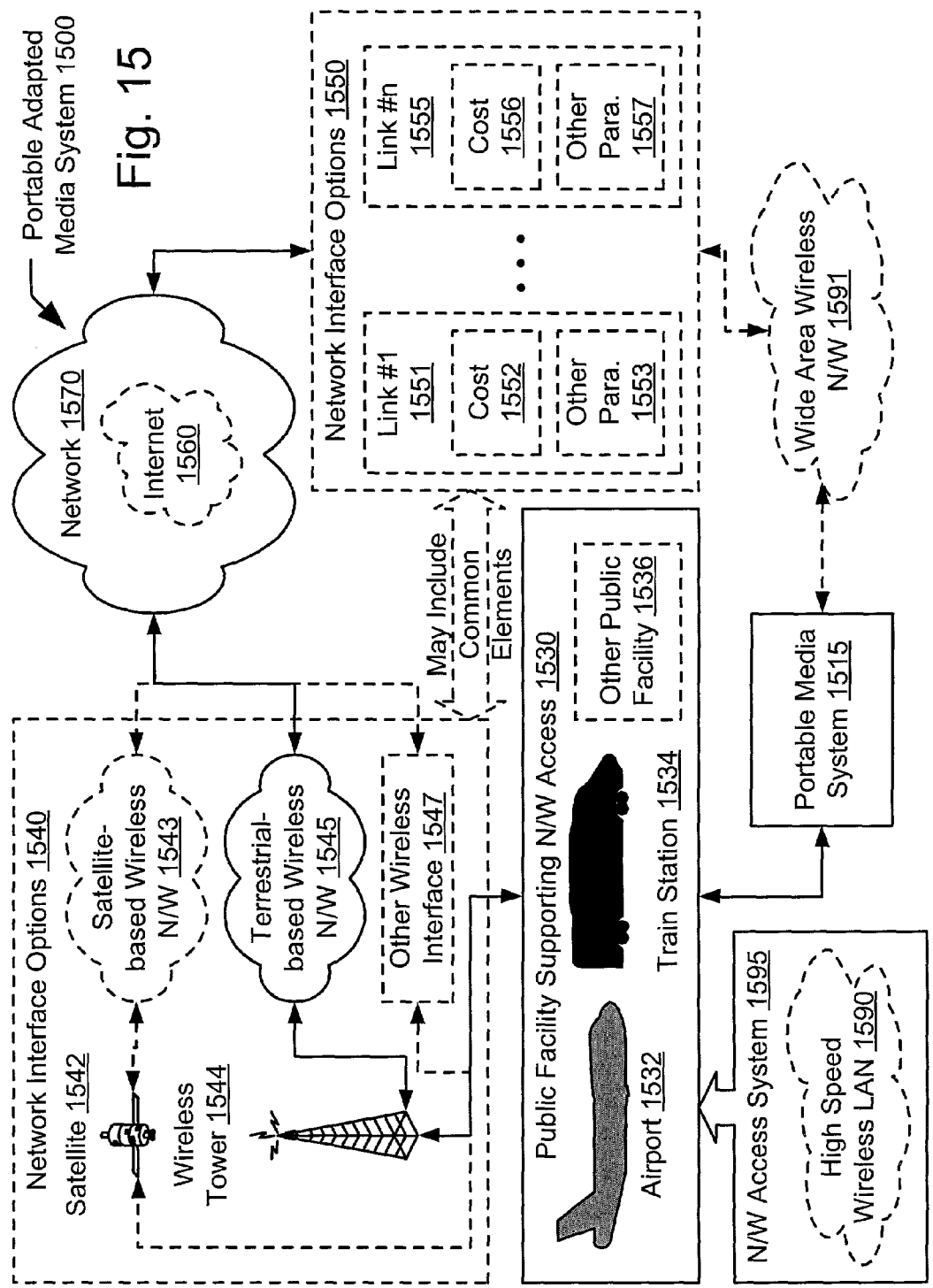
FIG. 15 is a system diagram illustrating an embodiment of a portable adapted media system that is built in accordance with certain aspects of the present invention.

FIG. 15 is a system diagram illustrating an embodiment of a portable adapted media system 1500 that is built in accordance with certain aspects of the present invention. A portable media system 1515 is operable to perform communication with a network 1570 using any of a variety or communication link paths. The portable media system 1515 may contain each of the various circuitries and devices contained within the vehicle media system 1410 of the FIG. 14 in certain embodiments of the invention. It may also contain additional circuitry offering greater functionality as well as will be seen in the various embodiments described herein. The network 1570 is the Internet 1560 itself in certain embodiments of the invention, but the network 1570 may also be any other network as well without departing from the scope and spirit of the invention.

In one instance, the portable media system 1515 is operable to perform communication with the network 1570 using the functionality offered by a public facility that supports network access 1530. The public facility supporting network access 1530 is any number of various types of public facilities. Some examples of the public facility supporting network access 1530 include an airport 1532 and a train station 1534. However, any other public facility 1536 is also included within the scope and spirit of the invention. The public facility supporting network access 1530 employs a network access system 1595 that may employ a high speed wireless LAN 1590 to provide for access to the network 1570.

The manner is which the portable media system 1515 accesses the network 1570, using the functionality of the public facility supporting network access 1530, may be performed in any number of ways as shown by the network interface options 1540. For example, the network interface may be achieved using a wireless tower 1544 that communicatively couples to a terrestrial-based wireless network 1545 that itself communicatively couples to the network 1570. However, in alternative embodiments, the network interface may be achieved using a satellite 1542 that communicatively couples to a satellite-based wireless network 1543 that itself communicatively couples to the network 1570. Moreover, any other wireless interface 1547 may also be used to perform the communicative coupling. It is also understood that a wireline communicative coupling, that connects the portable media system 1515 to the network 1570 through the public facility supporting network access 1530 is also envisioned within the scope and spirit of the invention. For example, a wireline hook-up may be provided for the portable media system 1515 within the public facility supporting network access 1530 to allow access to the network 1570. In addition, any number of communication links may exist within the network interface options 1540 by which the portable media system 1515 may access the network 1570.

In another instance of connecting the portable media system 1515 to the network 1570, any number of network interface options 1550 may also be used. These network interface options 1550 may be accessed by the portable media system 1515 using a wide area wireless network 1591. From certain perspectives, the wide area wireless network 1591 is employed when the portable media system 1515 does not have access to another connection to the network 1570. For example, in situations where the portable media system 1515 cannot get access to the high speed wireless LAN 1590, or another high performance network that allows for network access, the portable media system uses the wide area wireless network 1591 to access the network 1570.

The network interface options 1550 includes an indefinite umber of links, shown as a link #1 1551, . . . , and a link #n 1555. Each of the various links 1551 . . . 1555 include a number of parameters by which they may be characterized. For example, the link #1 1551 includes a cost 1552 by which the link #1 1551 may be compared to the other links within the network interface options 1550. In certain instances, a user of the portable media system 1515 may prefer to perform connection to the network 1570 via a cheaper link. However, in other situations, the need for connectivity is of such high importance that the cost of the link is of much reduced importance. The link #1 1551 may also include any other parameter 1553 by which it may be characterized and compared to other links within the network interface options 1550. Similarly, the link #n 1555 may also be characterized using a cost 1556 and any other parameter 1557.

It is also noted that the network interface options 1540 and the network interface options 1550 may both contain common elements. That is to say, the network interface options 1540 may be viewed as having multiple links, each of which may be characterized by certain parameters including cost and any other parameter. Similarly, the network interface options 1540 may also include all of the various functionality of the network interface options 1540 as well.

Figure 16:
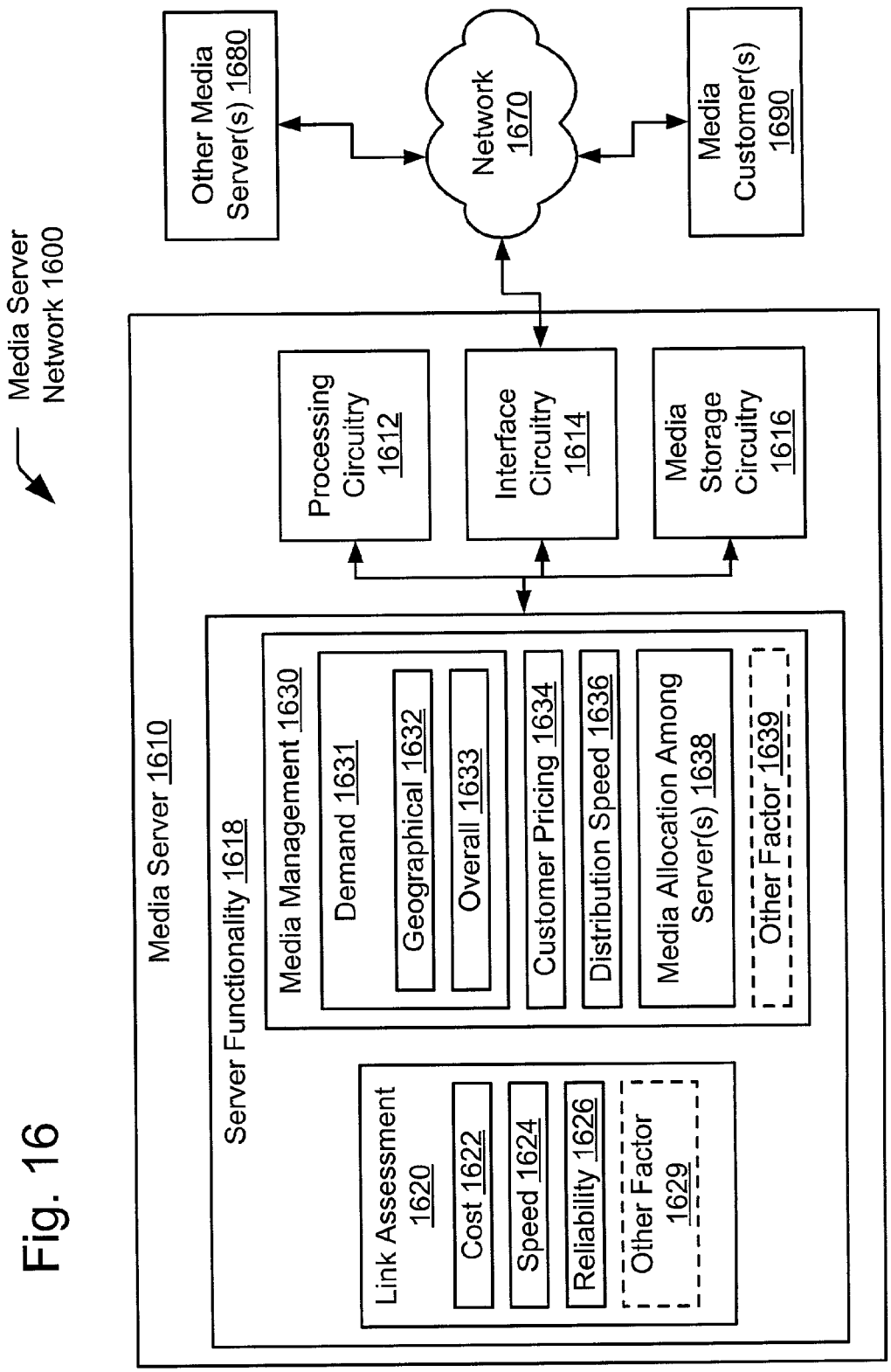
FIG. 16 is a system diagram illustrating an embodiment of a media server network constructed in accordance with certain aspects of the present invention.

FIG. 16 is a system diagram illustrating an embodiment of a media server network 1600 constructed in accordance with certain aspects of the present invention. The media server network includes a media server 1610 and an indefinite number of other media server(s) 1680 that all communicatively couple to a network 1670. Again, the network 1670 may itself be the Internet in certain embodiments of the invention. All of the functionality of the media server 1610 may also be included within the other media server(s) 1680 as well. An indefinite number of media customer(s) 1690 also are provided communicative coupling to the network 1670. The indefinite number of media customer(s) 1690 may include as few as one customer without departing from the scope and spirit of the invention.

The media server 1610 includes processing circuitry 1612 and media storage circuitry 1616. The media server 1610 employs interface circuitry 1614 to perform communicative coupling to the network 1670. The media server 1610 is operable to perform various server functionality 1618. The server functionality 1618 includes media management 1630 and link assessment 1620. For example, the server functionality 1618 provides for assessment of the various links by which it may perform communicative coupling to the network 1670 in terms of a number of parameters including cost 1622, speed 1624, reliability 1626, or any other factor 1629 as well.

The server functionality 1618 of the media server 1610, in terms of media management 1630, may perform media management 1630 between the media server 1610 and the other media server(s) 1680 or simply within the media server 1610. The media management 1630 includes management in terms of demand 1631. This demand 1631 may be characterized in terms of many parameters including geographical 1632 and overall 1633. That is to say, there may be some media that is of particular high demand in certain geographical regions. For example, in the context of sporting events, it may be desirable to ensure that a particular media server, located within relatively close geographical proximity to a given city contains media that does have of will have a high demand within that city. Any other partition of geography may also be sued without departing from the scope and spirit of the invention, including a state or a region. This media may then be stored within the media server 1610 using the media storage circuitry 1616.

Media management 1630 may also be performed in terms of customer pricing 1634. For example, any one of the media customer(s) 1690 may set certain caps or cutoffs of media for which they do not even desire to purchase. Moreover, there may be links over which certain of the media customer(s) 1690 may not wish to acquire media because the cost is prohibitive for them. Therefore, the customer pricing 1634 may be performed using constraints provided by the media customer(s) 1690. However, the customer pricing 1634 may be performed using constraints provided by the media server 1610 as well. For example, a company operating the media server 1610 may perform customer pricing 1634 as well. The company may set customer pricing 1634 to be processed using the media server 1610.

Media management 1630 may also be performed in terms of distribution speed 1636. The media server 1610 may be adapted to perform distribution of media only when the distribution speed 1636 is above a certain threshold. Alternatively, any one of the media customer(s) 1690 may decide to receive distribution of media from the media server 1610 only when the distribution speed 1636 meets a certain threshold.

The threshold for which the media server performs distribution of media and a customer-defined threshold need not be the same threshold.

Media management 1630 may also be performed in terms of allocating media stored among any number of various server(s) 1638. For example, media management 1630 may include moving media from one media server to another based on any of the above-described considerations. For example, If it is determined that certain media is infrequently demanded in a given geographical region, then that media may then be transferred to a media server that may more appropriately store the media. In addition, there may be any other factor 1639 by which media management may be performed.

Figure 17:
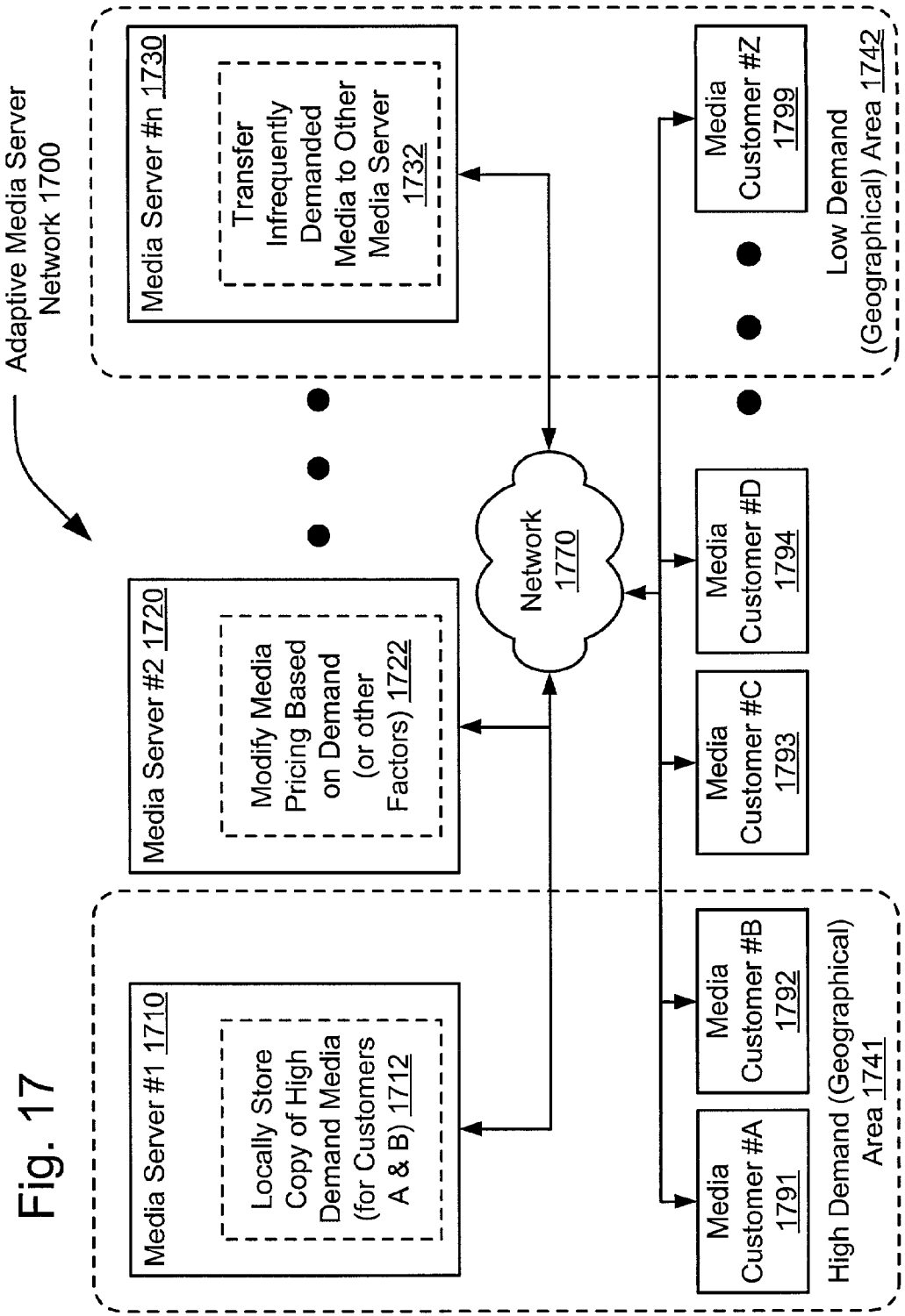
FIG. 17 is a system diagram illustrating an embodiment of an adaptive media server network that is built in accordance with certain aspects of the present invention.

FIG. 17 is a system diagram illustrating an embodiment of an adaptive media server network 1700 that is built in accordance with certain aspects of the present invention. Any number of media servers are communicatively coupled to a network 1770. Again, the network 1770 may itself be the Internet in certain embodiments of the invention. In addition, any number of media customers are also able to communicatively couple to the network 1770. The functionality of the adaptive media server network 1700 allows for adaptive media processing, including media transfer among the various media servers within the adaptive media server network 1700. Each of the media servers within the adaptive media server network 1700 are operable to perform communication and cooperative processing to handle the various media stored and transferred among and between them.

The indefinite number of media servers are shown as a media server #1 1710, a media server #2 1720, . . . , and a media server #n 1730. In addition, the indefinite number of media customers are shown as a media customer #A 1791, a media customer #B 1792, a media customer #C 1793, a media customer #D 1794, . . . , and a media customer #Z 1799.

Sometimes, certain of the media servers and some of the media customers are both in a high demand geographical area 1741. In such instances, it makes sense to ensure that high demand media, as desired by the media customer #A 1791 and the media customer #B 1792, is stored locally on the media server #1 1710 within the high demand geographical area 1741. This is shown graphically as the functional block 1712 where high demand media is stored locally on the media server #1 1710 for use by the media customer #A 1791 and the media customer #B 1792. It is also noted that the high demand geographical area 1741 may not suggest solely that the media customer #A 1791 and the media customer #B 1792 as well as the media server #1 1710 are all within a common geographical area, but rather the media server #1 1710 may be the best media server that can provide for high demand media to the media customer #A 1791 and the media customer #B 1792. That is to say, the media server #1 1791, though perhaps further away from the media customer #A 1791 and the media customer #B 1792 in terms of distance, they are nevertheless "closer" in terms of performance of communicative coupling offered by the network 1770. For example, is situations where the media server #2 1720 is very close to the media customer #A 1791 and the media customer #B 1792, yet it may be accessed via a dial-up modem, whereas the media server #1 1710 may be accessed via an Ethernet connection, the media server #1 1710 may be "closer" from a network perspective.

Analogously, it may be more efficient to transfer infrequently demanded media from one media server to another media server, as shown by the functional block 1732 within the media server #n 1730. This situation may occur in a low demand geographical area 1742. It may be that the media customer #Z 1799 perform very little demand, perhaps none at all, of any media stored locally on the media server #n 1730. In such an instance, it may make sense to transfer the infrequently demanded media to another media server where it is demanded more frequently, as shown by the functional block 1732. This will free up space on the media server #n 1730.

In addition, the various media servers may modify media pricing based on demand (or any other factors as well), as shown by the modify pricing based on demand (or other factors) functional block 1722 within the media server #2 1720. It is also understood that the functionality of the functional blocks 1712, 1722, and 1732 may be included within each of the various media servers, namely, the media server #1 1710, the media server #2 1720, . . . , and the media server #n 1730.

Figure 18:
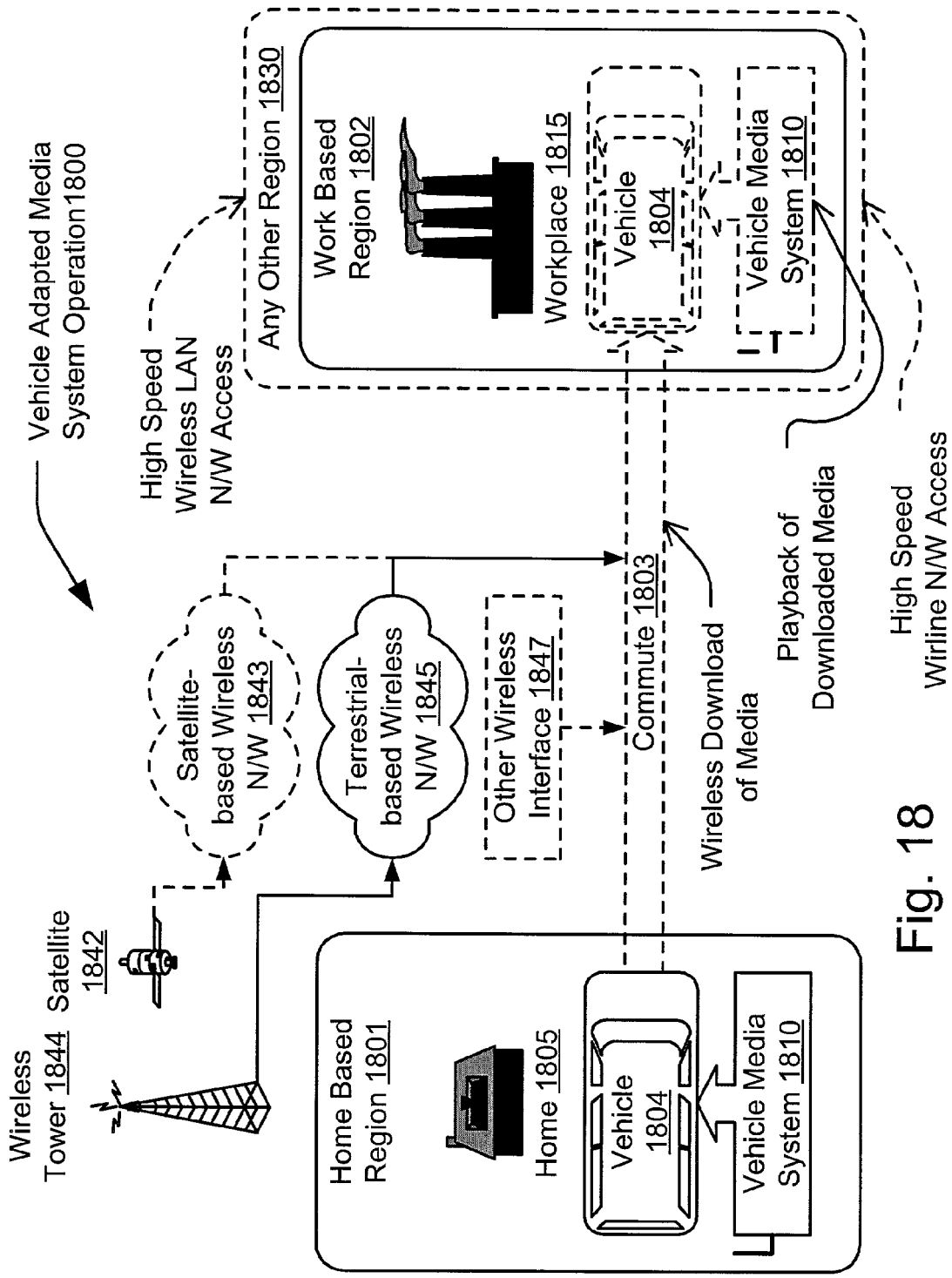
FIG. 18 is a system diagram illustrating an embodiment of vehicle adapted media system operation that is performed in accordance with certain aspects of the present invention.

FIG. 18 is a system diagram illustrating an embodiment of vehicle adapted media system operation 1800 that is performed in accordance with certain aspects of the present invention. A vehicle 1804 that includes a vehicle media system 1810 begins in a home based region 1801. The vehicle 1804 may be parked at the operator's home 1805. Alternatively, the home based region 1801 may simply be a region in which the vehicle media system 1810 is deemed to be in its "home region." Such terminology is sometimes used in the cellular telephone context. It may be that the vehicle media system 1810 is afforded reduced wireless connectivity rates or greater service within the home based region 1801. Alternatively, the home based region 1801 may simply be the region in which the operator of the vehicle 1801 may access the functionality offered within his home 1805. For example, in various embodiments of the invention as shown and described above, a garage or parking space for a vehicle, that may be at the home 1805, may include network access via a high speed wireless LAN. Any of the various functionality described above within these embodiments is also included within the vehicle media system 1810 shown in the FIG. 18.

The vehicle 1804 is then operable to perform some transportation, including a commute 1803 to a work based region 1802 in which the vehicle operator's workplace 1815 is located. Alternatively, the vehicle 1804 is then operable to perform some transportation to any other region 1830. During the commute 1803, the vehicle media system 1810 is operable to perform wireless download of media. This wireless download may also include receipt of streaming media as well via a wireless means. The wireless download may also include receipt in real time of a broadcast signal, be it digital or analog, without departing from the scope and spirit of the invention, as described above in the various embodiments of an integrated cable modem and cable television.

The manner is which the vehicle media system 1810 performs the wireless media download during the commute 1803 is one of any number of varied options. For example, the wireless media download may be achieved using a wireless tower 1844 that communicatively couples to a terrestrial-based wireless network 1845 that itself communicatively couples to a network from which media is downloaded. However, in alternative embodiments, the wireless media download may be achieved using a satellite 1842 that communicatively couples to a satellite-based wireless network 1843 that itself communicatively couples to the network from which media is downloaded. Moreover, any other wireless interface 1847 may also be used to perform the communicative coupling to a network from which media is downloaded.

After the vehicle 1804 has arrived at the work based region 1802 where the workplace 1815 is located, or to any other region 1830, then the vehicle media system 1810 is operable to perform playback of the downloaded media. Again, the vehicle media system 1810 may also be a portable/dockable media system in accordance with the invention thereby allowing a user of the vehicle media system 1810 to remove it from the vehicle 1804 and take it with him into the workplace 1802 or any other place where playback of the downloaded media may be performed. In addition, the any other region 1830, whether it includes the work based region 1802 or the workplace 1815, may also provide for high speed wireless LAN network access. In addition, as is often the case in many workplaces 1815, there may also be provided high speed wireline network access, within the any other region 1830, through which the vehicle media system 1810 may perform any of the functionality described above in various embodiments of the invention including download of media, receipt of streaming media, and receipt of a broadcast transmission.

Figure 19:
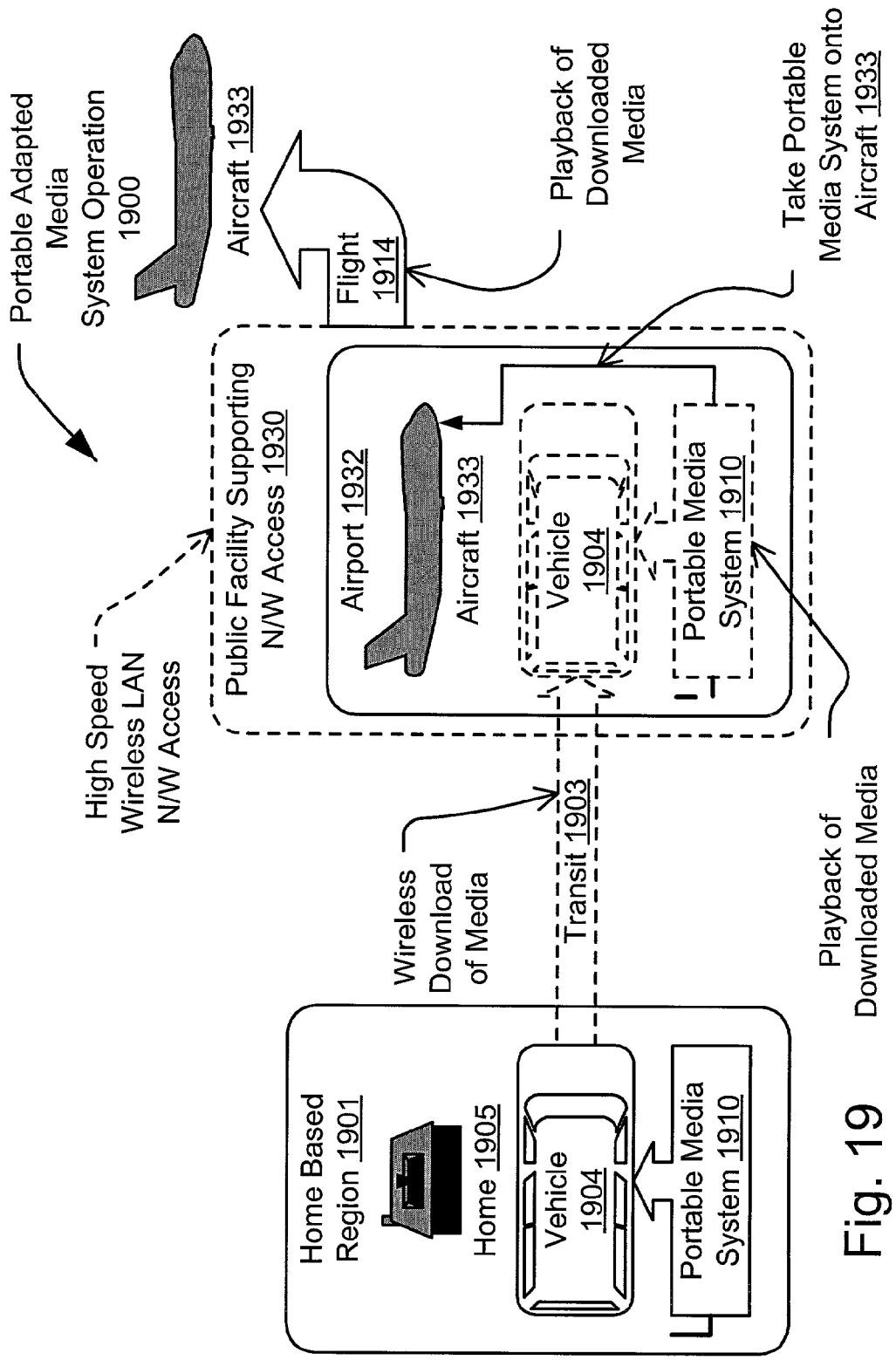
FIG. 19 is a system diagram illustrating an embodiment of portable adapted media system operation that is performed in accordance with certain aspects of the present invention.

FIG. 19 is a system diagram illustrating an embodiment of portable adapted media system operation 1900 that is performed in accordance with certain aspects of the present invention. A vehicle 1904 that includes a portable media system 1910 begins in a home based region 1901. The vehicle 1904 may be parked at the operator's home 1905. Alternatively, the home based region 1901 may simply be a region in which the portable media system 1910 is deemed to be in its "home region." Such terminology is sometimes used in the cellular telephone context. It may be that the portable media system 1910 is afforded reduced wireless connectivity rates or greater service within the home based region 1901. Alternatively, the home based region 1901 may simply be the region in which the operator of the vehicle 1901 may access the functionality offered within his home 1905. For example, in various embodiments of the invention as shown and described above, a garage or parking space for a vehicle, that may be at the home 1905, may include network access via a high speed wireless LAN. Any of the various functionality described above within these embodiments is also included within the portable media system 1910 shown in the FIG. 19.

The vehicle 1904 is then operable to perform some transportation, including a transit 1903 to an airport 1932 in which an aircraft 1933 is located. Alternatively, the vehicle 1904 is then operable to perform some transportation to any other region including a public facility supporting network access 1930. During the transit 1903, the portable media system 1910 is operable to perform wireless download of media. This wireless download may also include receipt of streaming media as well via a wireless means. The wireless download may also include receipt in real time of a broadcast signal, be it digital or analog, without departing from the scope and spirit of the invention, as described above in the various embodiments of an integrated cable modem and cable television and the various vehicle media systems.

The manner is which the portable media system 1910 performs the wireless media download during the transit 1903 is one of any number of varied options. For example, as described in other embodiments, the wireless media download may be achieved using a wireless tower that communicatively couples to a terrestrial-based wireless network that itself communicatively couples to a network from which media is downloaded. However, in alternative embodiments, the wireless media download may be achieved using a satellite that communicatively couples to a satellite-based wireless network that itself communicatively couples to the network from which media is downloaded. Moreover, any other wireless interface may also be used to perform the communicative coupling to a network from which media is downloaded.

After the vehicle 1904 has arrived at the airport 1932 where the aircraft 1933 is located, or to any other region, or a public facility supporting network access 1930, then the portable media system 1910 is operable to perform playback of the downloaded media. Again, the portable media system 1910 may also be a vehicle media system in accordance with the invention as well. A user of the portable media system 1910 may then take the portable media system 1910 with him into the airport 1932, and also onto the aircraft 1933, if so desired. Playback of downloaded media may then also be performed on the portable media system 1910 during a flight 1914 of the aircraft 1933. If permitted by the Federal Aeronautic Administration, the portable media system 1910 also offers the functionality to perform wireless download of media within the air using its own wireless communication functionality. Alternatively, the portable media system 1910 may also use a telephone on board the aircraft 1933 to access a network from which it may perform communicative coupling during the flight 1914 so that media may be received.

Within any of these various places, playback of the downloaded media may be performed. In addition, the public facility supporting network access 1930 may also provide for high speed wireless LAN network access. In addition, there may also be provided high speed wireline network access, within the public facility supporting network access 1930, through which the portable media system 1910 may perform any of the functionality described above in various embodiments of the invention including download of media, receipt of streaming media, and receipt of a broadcast transmission.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A method comprising:
in an audio/video (A/V) processing device:
receiving a record indication to record an A/V program during a current broadcast of the A/V program, the record indication received after an initial portion of the A/V program has already been broadcast, and in response:
recording the A/V program by:
obtaining and recording the initial portion of the A/V program by obtaining the initial portion of the A/V program from a remote program server connected to the A/V processing device through a communication network; and
obtaining and recording a remaining portion of the A/V program that follows the initial portion.

2. The method of claim 1, comprising obtaining and recording the remaining portion of the A/V program during the current broadcast of the A/V program.

3. The method of claim 1, where obtaining the initial portion of the A/V program from a remote program server comprises:
obtaining the initial portion from an A/V program database of the remote program server.

4. The method of claim 1, where obtaining the remaining portion of the A/V program comprises:
obtaining the remaining portion from an A/V program database of the remote program server.

5. The method of claim 1, where:
obtaining the initial portion comprises obtaining A/V program data for the initial portion of the A/V program that has already broadcast from an A/V program database of the remote program server, while contemporaneously presenting the current broadcast of the A/V program through a user interface.

6. The method of claim 1, where:
obtaining the initial portion, the remaining portion, or both, comprises obtaining A/V program data from an A/V program database of the remote program server after the current broadcast of the A/V program completes.

7. The method of claim 1, where obtaining the initial portion and obtaining the remaining portion occur concurrently.

8. A system comprising:
a memory; and
circuitry in communication with the memory, the circuitry operable to:
identify a record indication to record an audio/video (A/V) program during a current broadcast of the A/V program, the record indication received after an initial portion of the A/V program has already been broadcast, and in response:
obtain the A/V program by:
obtaining and storing the initial portion of the A/V program in the memory by obtaining the initial portion of the A/V program from a remote program server connected to the system through a communication network; and
obtaining and storing a remaining portion of the A/V program in the memory, where the remaining portion of the A/V program follows the initial portion.

9. The system of claim 8, where the circuitry is operable to:
obtain and store the remaining portion of the A/V program by recording the remaining portion during the current broadcast of the A/V program.

10. The system of claim 8, where the circuitry is operable to:
obtain the initial portion of the A/V program from an A/V program database of the remote program server.

11. The system of claim 8, where the circuitry is operable to:
obtain the remaining portion of the A/V program from an A/V program database of the remote program server.

12. The system of claim 8, further comprising:
a user interface; and
where the circuitry is further operable to:
obtain the initial portion by obtaining A/V program data for the initial portion of the A/V program that has already broadcast from an A/V program database of the remote program server while contemporaneously presenting the current broadcast of the A/V program through the user interface.

13. The system of claim 8, where the circuitry is operable to:
obtain the initial portion, the remaining portion, or both, by obtaining A/V program data from an A/V program database of the remote program server after the current broadcast of the A/V program completes.

14. The system of claim 8, where the circuitry is further operable to:
obtain the initial portion and obtain the remaining portion concurrently.

* * * * *